US008301389B2

(12) United States Patent
Dunlap

(10) Patent No.: US 8,301,389 B2
(45) Date of Patent: Oct. 30, 2012

(54) SYSTEM AND METHOD FOR PLANT SELECTION

(76) Inventor: Susan C. Dunlap, Menlo Park, CA (US)

( * ) Notice: Subject to any disclaimer, the term of this patent is extended or adjusted under 35 U.S.C. 154(b) by 819 days.

(21) Appl. No.: 11/384,004

(22) Filed: Mar. 17, 2006

(65) Prior Publication Data

US 2006/0224327 A1 Oct. 5, 2006

Related U.S. Application Data

(60) Provisional application No. 60/663,483, filed on Mar. 18, 2005.

(51) Int. Cl.
*G01N 33/48* (2006.01)
*G06G 7/48* (2006.01)

(52) U.S. Cl. ............................................. 702/19; 703/11

(58) Field of Classification Search ........................ None
See application file for complete search history.

(56) References Cited

OTHER PUBLICATIONS

Simon and Schusters Guide to Plants and Flowers (ISBN-10: 0671222473 Publisher: Fireside—May 12, 1976, relevant pages included).*
Xreferplus: Webster's NewWorld computer dictionary, Term:Database, 2003.*
Plant Select Database (University of Minnesota, [online], web. archive.org/web/20001205083600/www.sustland.umn.edu/plant/search.asp accessed on Oct. 1, 2007).*
Plants Facts (web.archive.org/web/20021202223402/http://plantfacts.osu.edu/Plant/a_search.lasso).*
Sustland picture tab (University of Minnesota, [online], www.sustland.umn.edu/plants/, accessed on Apr. 25, 2008).*
Plant facts (Ohio State University, [online], plantfacts.osu.edu/plant/a_search.lasso, accessed Apr. 25, 2008).*
Tsagari et al. (e-flora: e-commerce & the agricultural SMEs in E-work and E-commerce: Novel Solutions and Practices for a Global Networked Economy, Edited by Brian Stanford-Smith and Enrica Chiozza, Cheshire Henbury, ISBN 1-58603-205-4, 2001).*
Anderson, EF, The Cactus Family, 2001, Timber Press, Portland, OR.
Bailey, LH et al, ed, Hortus Third, A Concise Dictionary of Plants Cultivated in the United States and Canada, 1976, Wiley.
Brenzel, K, ed, Sunset Western Garden Book, 2001, Sunset Publishing Co., Menlo Park, CA.
Brickell, C et al, The American Horticultural Society A-Z Encyclopedia of Garden Plants, 1997, DK Publishing.
Brickell, C, ed, The American Horticultural Society Encyclopedia of Plants and Flowers, 2004, Macmillan.
Cheifetz, A et al, ed, Botanica's Trees and Shrubs, 1999, Laurel Glen Publishing, San Diego, CA.
Citron, J, ed, Selected Plants for Southern California Gardens, 2000, Southern California Horticultural Society, Los Angeles, CA.
Walters, SM et al, The European Garden Flora, 1986, Cambridge University Press, Cambridge, UK.
Griffith, M, Index of Garden Plants, 1992, Macmillan Press, Ltd., London, UK.

(Continued)

*Primary Examiner* — Larry D Riggs, II
(74) *Attorney, Agent, or Firm* — Moore Patents; David Dreyfuss; Cynthia R. Moore

(57) ABSTRACT

Processes, systems and databases are provided for plant selection. The processes may include providing a database of plant species and eliminating a portion of the plant species based on at least two search criteria including a user's desired climate zone or location plant cultivation, plant size, plant type, plant leaf type/shape, plant form/habit, plant primary attributes, parcel growing conditions, and desired characteristics. At least one image of the plant species meeting the search criteria may be displayed wherein the image has sufficient resolution to distinguish among different plant species.

26 Claims, 16 Drawing Sheets
(11 of 16 Drawing Sheet(s) Filed in Color)

OTHER PUBLICATIONS

Preston-Mafham, R et al, Cacti, The Illustrated Dictionary, 1995, Cassell Publishers, Ltd.

Sajeva et al, Succulents, The Illustrated Dictionary, vols. I & II, 1997 & 2001, Timber Press, Portland, OR.

Hoga, S, ed, Flora, A Gardener's Encyclopedia (software distributed on CD), 2003, Global Book Publishing, Australia (dist. by Timber Press).

Monrovia, http://www.monrovia.com/PlantInf.nsf/$$Search, earliest date found at www.archive.org: Aug. 15, 2006.

Better Homes and Gardens, http://www.bhg.com/bhg/plantfinder (select "detailed search"), existed in similar form prior to Mar. 2005.

Dave'S Garden, http://www.davesgarden.com/pf/ (select "advanced search"), existed in similar form prior to Mar. 2005.

Sunset, http://www.sunset.com/sunset/garden/superpackage/0,22336,1160094,00.html, Jul. 17, 2007.

Martha Stewart, http://www.marthastewart.com (select "gardening," then "browse all plants," earliest date at www.archive.org (different link): Nov. 24, 2005.

USDA, http://plants.usda.gov (select "advanced search"), existed in similar form prior to Mar. 2005.

Horgan, GW et al, "Use of Statistical Image Analysis to Discriminate Carrot Cultivars", Computers and Electronics in Agriculture, 2001, 31:191-199.

* cited by examiner

SYSTEM AND METHOD FOR PLANT SELECTION

CROSS-REFERENCE TO RELATED APPLICATIONS

This application claims priority from U.S. Provisional Application No. 60/663,483, filed on Mar. 18, 2005, which is incorporated by reference herein in its entirety. This application also incorporates by reference U.S. application Ser. No. 11/015,760, filed Dec. 16, 2004, and its corresponding U.S. Provisional Application No. 60/530,359 filed on Dec. 16, 2003.

FIELD OF THE INVENTION

The present invention relates to an improved method for the selection and identification of plant species and genera using an improved database of plant information. In one aspect of the invention, the process is based on the characteristics of the plant's apical complex. The present invention also relates generally to methods and apparatus for providing search results in response to a search query provided by a user.

BACKGROUND OF THE INVENTION

A long-standing problem that has frustrated anyone seeking to identify an unknown plant specimen using traditional resources is the inability to simply and accurately identify the plant species and its genus based on the specimen's physical traits. As identification is necessary to plant selection (for example, in landscape design), these same frustrations apply to the plant selection process as well.

Presently, there are limited methods for identifying a plant species and sorting through plant data. One common method of identifying a plant species includes the use of the internet to search through various electronic databases. However, websites containing these relatively limited databases are generally designed to provide information relating to a known species of a plant, and therefore, one must have prior knowledge of the species in order to use the databases effectively. For a novice who is unfamiliar with plant identification or botanical terminology, there are many obstacles for searching the database. Therefore, without the knowledge of additional botanical terms beyond the simple description of a plant specimen, such as a leaf or a flower, it may be difficult to perform an effective search in order to sort through plant data and to identify the plant genus or the plant species for any purpose.

Another common method of identifying a plant is with the use of literary sources, such as texts and encyclopedia that document various plant species. Although the publications may include pictures, photographs and descriptions of a plant, there are no systematic documentations or procedures established among the publications.

Similarly, there exists various methods, apparatus and systems for uniquely identifying human individuals by their particular physical characteristics, such as the individual's unique finger prints, palm prints, iris, facial features, or combinations thereof. For example, particular facial parameters such as the distances between identifiable points on the human face, and/or ratios of the facial parameters may be used to identify an individual as the parameters for each individual are unique. Particular parameters such as the distance between the eye pupils, the distance from each eye pupil to the nose bottom and to the mouth center, and the distance from the nose bottom to the mouth center are set forth. The technologies have been disclosed in U.S. Pat. No. 4,975,969 and references cited therein.

In addition, methods known in the art for identifying or selecting plants meeting variously user-desired characteristics are also particularly lacking. None of the known systems for plant identification or plant selection provides an optimized or unified system for identifying or selecting plant species. Many plant selection tools cover a very limited number of plants such as the inventory of a particular vendor. All are limited by the inadequacies of the database on which they are based as outlined above. Among those print resources that have larger databases such as *The American Horticultural Society Encyclopedia of Plants & Flowers* (DK Publishing, New York, 2002) or the *Sunset Western Garden Book* (Sunset Publishing, Menlo Park, Calif., 2001), the plant selectors are limited to lists of plants that satisfy a particular need sorted coarsely by other attributes. For example, in the *Encyclopedia of Plants & Flowers*, the user might select "plants for sandy soil," sorted by plant type [tree, perennial, etc.], with additional symbols identifying some limited addition traits. In the *Western Garden Book*, the user might select "garden trees," sorted by general application and type [such as "deciduous patio tree"] and find a list with additional symbols identifying preferred light and growing zone.

Computer-based plant selectors also exist such as *Flora* (Global Book Publishing, NSW, Australia, 2003). This CD-based tool allows plant selection from a limited database of 20,000 plants based on a limited number of attributes (eight: plant group, use, hardiness zone, height, "award plant," "position" [sun, half. sun, shade], flower color, flower season). While it contains some plant images, images are not used as part of the selection process.

Thus, all prior art plant selectors suffer from being incomplete, having inconsistent plant descriptions and inconsistent images, and being generally "floral-centric" (focusing on flowers rather than vegetative features of plants). Neither the text-based nor the visual systems available enables a blind search within the potential vegetative inventory and cannot be easily used to manage information. This inability has created a deficiency in the industry and the industry has responded to this deficiency by actively limiting the diversity of plants in cultivation at any one time. It is estimated that only 3% of the potential inventory is available at any one time, and the available market has become constricted. Therefore, there is a need for establishing a systematic method for compiling a comprehensive and consistent database of plant species to assist in the identification and/or selection of plants for both novices and experts in the field. There is also a need for a plant selection tool that can be easily used by a novice and experienced users alike to select plants from the database.

SUMMARY OF THE INVENTION

The present invention provides solutions for at least some of the drawbacks discussed above. The present systems, processes and databases will help horticulturists overcome the current disadvantages associated with having to deal with a tremendous number of species and enable commercial users to expand their products and businesses. Unlike the text-based systems in current use, embodiments of the present invention will create a visual plant selection system that can be used by a wide audience, including non-experts mystified by botanical nomenclature. The present systems, processes and databases are useful to a wide variety of users, including plant retailers, plant wholesalers, academics, scholars, researchers, naturalists, librarians, homeowners, landscape designers and contractors, urban planners, horticulturists, and collectors. Fewer than 10% of the plants in cultivation are visually represented by photographs in the current literature, and these visuals are generally not designed to assist in the determination of a plant's identity or to assist in plant selection.

Accordingly, there is provided a process for plant selection. A database of plant information is constructed comprising a variety of information about each plant species, including information pertaining to selection criteria and preferably a photographic image of the plant's apical complex. The apical complex of a plant illustrates unique identifying traits for each plant species. A portion of the database is eliminated from consideration using any combination of two or more search criteria, including but not limited to, a desired climate zone or location, plant cultivation, plant size, plant type, plant leaf type/shape, plant form/habit, plant primary attributes, desired exposure, flowering season, parcel growing conditions, and desired characteristics), additional unsuited plant species are eliminated. In a preferred embodiment, the desired climate zone or location is used as a first search criterion. Images of the plant species meeting the search criteria are displayed, preferably including an image of the apical complex typical for the plant. Text prompts and image prompts (often displaying the apical complex) are provided to offer multiple routes for navigating the selection process. When the number of potential plant species meeting the search criteria drops to a desired number of potential matches, images of candidate species can be simultaneously displayed (e.g., 100, 50, 25, 10 or the like as desired by the user). In a preferred embodiment, the potential matches are displayed when there are less than 50 potential matches. At any point in the selection process, the number of potential plant species meeting the search criteria can be displayed.

The plant selection system can be implemented on a variety of computer hardware, including desktop computers, laptops, and handheld devices. It can also be implemented in a client-server configuration, where the database and selection engine is implemented on a server, and the user interface is implemented on a client computer, for example, via an internet web browser.

Accordingly, in an additional embodiment, a computer implemented method for plant selection is provided, the method comprising: providing a user interface; displaying on the user interface, a first set of text prompts and image prompts; receiving the user selection; processing the user selection based on a selection tree and presenting a second set of text prompts and image prompts based on the user selection; receiving the user selection from the second set of text prompts and image prompts; repeating the displaying, receiving, and processing until the user is presented with images of potential plant matches. In a preferred aspect, the first set of text prompts relates to climate zone or location for a desired plant. Preferably, the selection tree is based on search criteria selected from the following group to further eliminate unsuited plant species: climate zone or location, plant cultivation, plant size, plant type, plant leaf type/shape, plant form/habit, plant primary attributes, parcel growing conditions, and desired characteristics. The method further comprises displaying images of all plants meeting the search criteria preferably when there are no more than 100 matches (e.g., 100, 50, 25, 10 or the like as desired by the user).

In an additional aspect, there is provided a plant selection system comprising: a client running on a client device; a server; said client configured to communicate with the server and display a user interface; said server having a processor with logic to process input from the user and send image data to the client for display to the user; said server configured to implement the method to guide the user to select plants. Image data is stored on the server and a portion of the image data can be stored by the client on a local computer.

A system to aid in a visual plant selection process is provided, comprising: an image database comprising a plurality of images of plant species; knowledge database, cross-referenced to said image database, for the purpose of assisting in the selection process; a user-interface to solicit, from a user in a sequential manner, a plurality of descriptive traits of a desired plant; and a selection tree, responsive to each of said traits, wherein said traits are employed by said engine to select, from a plurality of possible matches, a subset of matches that are consistent with the traits; and using the subset of matches, reorganizing an information space of said image database for concurrent presentation of a plurality of images for user review via the user-interface; wherein the user-interface is configured to continue to solicit descriptive traits based on the new subset of matches until the traits to be processed by the selection tree reduces the number of potential candidates below a predetermined level; wherein the user-interface is configured to continue soliciting distinguishing characteristics until a sufficient number of candidates below the predetermined level remain.

In an additional embodiment, a process is provided for compiling a database of plant species comprising: locating an apical complex of the plant, obtaining an image of the distinguishing characteristics of the apical complex typical for the plant species, correlating said image with information on the plant species related to a set of selection criteria, and storing said image and said selection criteria information in a database. In a preferred embodiment, the database comprises a plurality of records having a number of data fields including both text and image fields. In an additional preferred embodiment, the database is in computer readable form. Preferably, the images are photographic, although in some instances drawings may be useful. In an additional embodiment, a database is provided wherein the database is compiled by the above process. The database can be cross-referenced or merged with the database for plant identification disclosed in co-pending U.S. patent application Ser. No. 11/015,760.

One object of the present invention is to establish systematic standards in the horticulture field for capturing images of a plant's distinguishing features. One method is to gather systematic photographs of a plant's apical complex. Embodiments of the present processes and databases can provide visual aids and photographs that are interactive. The user can search while referring to the visual aids. Text searches of the present invention may be toggled to accompanying and informative visual aids. The user navigates through the plant family via image prompts and text prompts. The primary embodiment of the system is photo or image driven; however, it is possible for an advanced user to skip ahead using the text window. For most users, the system uses images to verify text-based traits at each point along the search. The users' options or selection are presented in both text and images. Most criteria in known systems are very technical, and, lacking photographic or visual reference, require too much from the novice user (e.g., the user needs to select from a variety of leaf arrangements in order to proceed). The present invention does not require the user to be informed about multiple, unrelated, glossary terms or sort criteria—it will have isolated the term one needs to know in order to navigate further in a search.

In yet another embodiment, an image database of plant images is provided. In specific embodiments, the images contain at least one apical view of each plant in the database.

The images can be used to select plants or find or confirm the identity of unknown plants. The images are created by a standardized method so that biometric data may be obtained from the image. Visual data and text data are linked so that they are viewed concurrently. Although not limited to just photographic images, line drawings are filtered data and may not convey the same level of detail as photographic images.

Additional objects, features and advantages of the invention will be set forth in the description which follows, and in part, will be obvious from the description, or may be learned by practice of the invention. The objects, features and advantages of the invention may be realized and obtained by means of the instrumentalities and combination particularly pointed out in the appended claims.

A further understanding of the nature and advantages of the invention will become apparent by reference to the remaining portions of the specification and drawings.

BRIEF DESCRIPTION OF THE DRAWINGS

The patent or application file contains at least one drawing executed in color. Copies of this patent or patent application publication with color drawings will be provided by the Office on request and payment of the necessary fee.

DESCRIPTION OF THE SPECIFIC EMBODIMENTS

Figure 1:
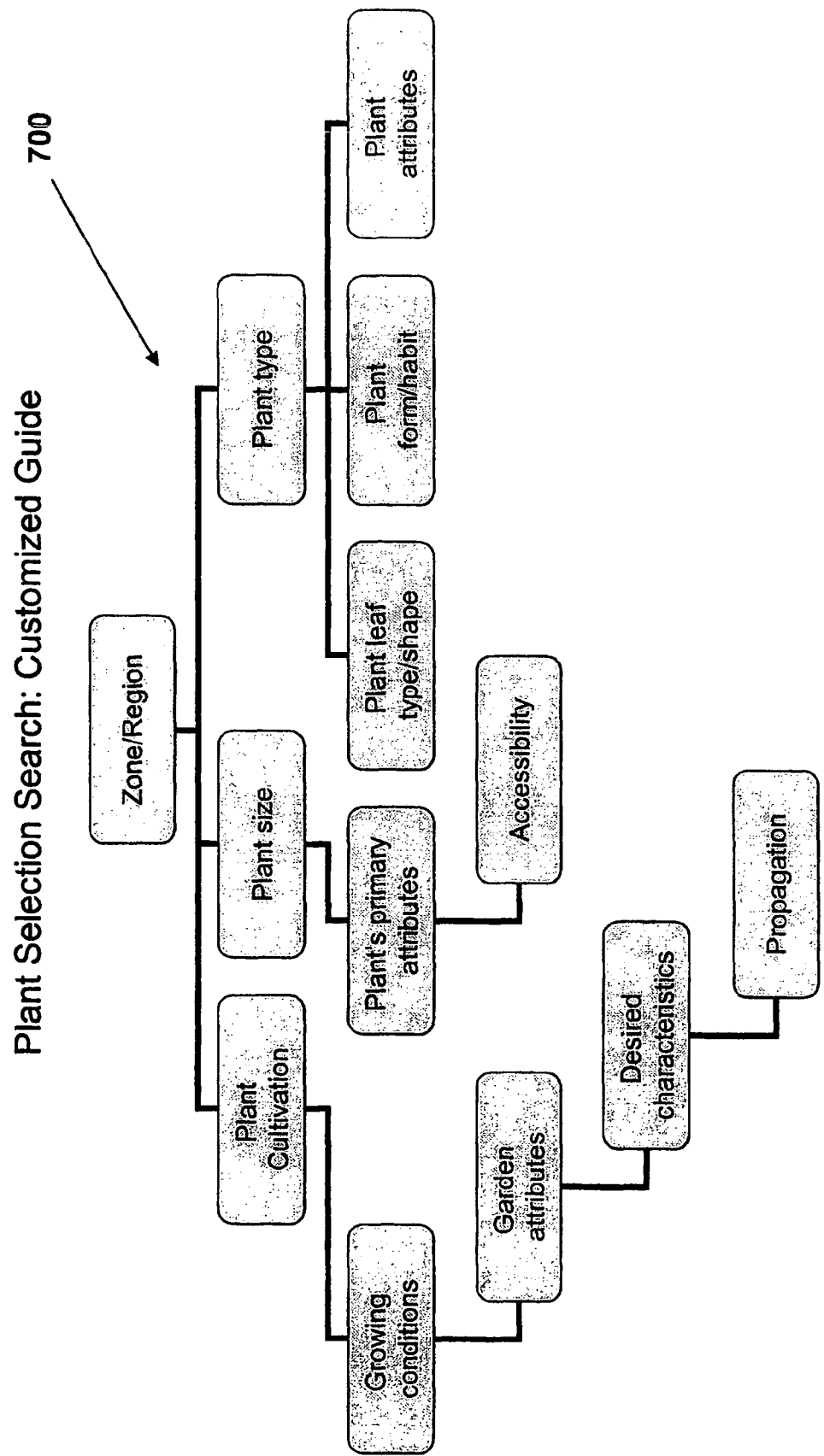
FIG. 1 shows one embodiment of a plant selection system according to the present invention.

It is to be understood that both the foregoing general description and the following detailed description are exemplary and explanatory only and are not restrictive of the invention, as claimed. It may be noted that, as used in the specification and the appended claims, the singular forms "a," "an" and "the" include plural referents unless the context clearly dictates otherwise. Thus, for example, reference to "a processor" may include multiple processors, and the like. References cited herein are hereby incorporated by reference in their entirety, except to the extent that they conflict with teachings explicitly set forth in this specification.

In one embodiment, a process is provided for compiling a database of plant species comprising: locating an apical complex of the plant, obtaining an image of the distinguishing characteristics of the plant, including the apical complex typical for the plant species, correlating said image with information on the plant species related to a set of selection criteria, and storing said image and said selection criteria information in a database. In a preferred embodiment, the database comprises a plurality of records having a number of data fields including both text and image fields. In an additional preferred embodiment, the database is in computer readable form. Preferably, the images are photographic, although in some instances drawings may be useful. The images can also show the longisectional views of the apical complex. In an additional embodiment, a database is provided wherein the database is compiled by the above process. In one variation, the database can be cross-referenced or merged with the database for plant identification disclosed in co-pending U.S. patent application Ser. No. 11/015,760. In a particular embodiment, the images are magnified. For example, the images can be shown magnified, e.g., at magnifications of about 2 times to about 10 times actual size or magnification, up to about 50 to about 100 times magnification, or even more as desired.

In one particular variation of the invention, the plant's distinguishing characteristics are included in the knowledge database. Such distinguishing characteristics can comprise the presence or absence of excessive soil moisture, tendrils or graspers, a twining habit, a trunk or vertical stem, feather-like leaves (fronds), fly trap, hinged, pitcher-shaped or sticky tentacular leaves, complex, showy flowers, aerial or exposed roots, sympodial or monopodial habit, center-folded leathery lance-shaped green leaves, leafless, thick, fleshy stem, spines and/or areoles, regularly spaced nodes or joints, a hollow stem, sheath(ing) leaves, multiple stems emanating from the plant's base, herbaceous leaves on a soft-wooded plant, woody stems, pinnate or palmately cleft (palm) leaves, other distinct leaf characteristics, a main stem or trunk with a crown of palm leaves, or a main stem or trunk. This process allows positive identification of plants using the plant's unique characteristics and can aid in plant selection.

In another particular variation, the distinguishing characteristics of the apical complex identified comprises the growth pattern of the apical complex selected from a member of the group consisting of the size, shape, color, presence or absence of the apical complex feature, position of the feature, geometrical dimension, flower, texture, a relationship thereof, and a combination thereof.

In a further variation, the distinguishing characteristic of the apical complex comprises the shape of the apex, presence of a spine, color of the spine, position of the spine, angle of the spine, size of the spine, presence of a spine shield, color of the spine shield, shape of the spine shield, length of the spine shield, color of an epidermis, shape of the epidermis, shape of a flowering eye, position of the flowering eye, presence of a leaf, position of the leaf, size of the leaf, shape of the leaf, color of the leaf, presence of a leaf scar, size of the leaf scar, shape of the leaf scar, color of the leaf scar, presence of a peduncle, position of the peduncle, size of the peduncle, frequency of the peduncle, presence of a prickle, position of the prickle, size of the prickle, texture of the prickle, presence of a rib, number of ribs present, depth of the rib, edge feature of the rib, width of the rib, contour of the rib, width of the spine shield relative to the width of the rib, shape of a stem, presence of a tubercle, size of the tubercle and shape of the tubercle or combinations thereof.

In each of the above variations, the apical complex of the plant shows at least one growth cycle, and preferably two or three growth cycles. In a preferred embodiment, the apical complex of the plant shows at least three growth cycles.

Although the distinguishing characteristics for the above embodiment is applicable to a large number of different types of plants, in one particular variation, the plant is a vascular plant. In a particular variation, the vascular plant is selected from the group consisting of the *Euphorbia* genus and Portulacaceae, the Cactaceae, Crassulaceae, Aloeaceae and Lilaceae families.

In one variation, the plant's information is stored in searchable format in response to a specific query in order to select the specific plant that satisfy the characteristic of the search criteria. In one variation of the above process, the process of selecting a plant employs a software algorithm to identify unknown or unidentified plants. In another variation of the above process, the software driven selection process uses guided text with complementary visual images to guide the user and assist the user to select plants or identify unknown or unidentified plants.

DEFINITIONS

Unless otherwise stated, the following terms used in the specification and claims shall have the following meanings for the purposes of this Application. The terms are also defined in the following texts: Vascular Plant Systematics, Radford, Dickison, Massey and Bell, 1976, Harper & Row, NY. The glossary may be found at http://ibiblio.org/botnet/glossary.html; Swartz, Dilbert, 1971, Collegiate Dictionary of Botany, NY, N.Y., The Ronald Press Company; Anderson, E. A., 2001, The Cactus Family, glossary, Oregon, Timber Press; Eggli, Urs, 1993; Glossary of Botanical Terms; Surrey, England, British Cactus & Succulent Society; Brickell, C & Zuk, J, editors, 1997, The American Horticultural Society A-Z Encyclopedia of Garden Plants, glossary, NY, N.Y., DK Publishing; Stein, Jesse, Ed. Random House Dictionary of the English Language; The Unabridged Edition, 1966, N.Y.; Radford, Dickison, Massey, Bell, 1976, Vascular Plant Systematics, N.Y., Harper & Row; Pridgeon, A. ed, 1992; The Illustrated Encyclopedia of Orchids, Oregon, Timber Press; Northen, R. T., 1962; Home Orchid Growing, N.Y., D. Van Nostrand Co., Inc. Particular definitions as used herein are as follows:

"Apex" means the tip, the extreme end, the summit, the growing point of a stem, branch, or root.

"Apical complex": apical=at the tip or apex, at the summit, belonging to the apex or point. (Position) towards, at, near, etc. the end (apex, tip, etc.) of an organ. "Complex": a group of complicated or interwoven parts or fibers. b. a mosaic of communities determined by the local diversity and geomorphic factors and repeating itself or occurring in diverse localities. Thus the "apical complex" refers to a complicated group of interwoven parts found when the tip, apex, or summit of a stem, branch, or plant is viewed overhead; e.g., a top view of the crown of a tree, an overhead view of a sub shrub, an overhead view of a single branch of a shrub, or the magnified longisection of the tip of a stem. This complex and various details of the complex may be visualized in various magnifications such as but not limited to, magnified lenses for photographic or imaging equipment, or may be visualized using electron micrographs or other magnified microscopic methods.

"Apical growth" means an extension in the length of the axis at the apex only of a branch or stem.

"Apical meristem" means the meristematic cells at the tip of a stem or root from which all the tissues of the mature axis are ultimately formed.

"Branch" refers to stem or limb growing from the trunk or main stem of a plant.

"Evergreen" means 1. having green foliage at all seasons, not deciduous, losing leaves at all seasons but never all of them at one time.

"Growth cycle" refers to a single growth period of a plant. A growth cycle of a plant may be observed, for example, in a woody plant as a layer of wood (for example, as an annual ring) that is produced during a single period of growth.

"Image" refers to a reproduction of the form of something, such as but not limited to, a plant or a specific characteristic of a plant. An image may be an optically formed duplicate or other representative reproduction of an object such as but not limited to, those obtained from taking photographs of an object. The reproduction may be obtained in one or more various forms, such as but not limited to, by a camera to produce a positive print or in digital format. The image may be an exact duplication of data in a file that is stored in a different medium.

"Keys" such as "verbal keys" or "visual keys" or "written keys" as defined in this Application, refers to 1. a systematic tabular classification of the significant characteristics of the members of a group of organisms to facilitate identification and comparisons. 2. written keys also refers to a systematic tabular classification of the significant characteristics of plants to facilitate identification and comparisons using botany terminology and other useful terms. 3. visual keys also refers to a systematic tabular classification of the significant characteristics of plants to facilitate identification and comparisons using photographs, diagrams, drawings and other visual aids.

"Leafy rosette" means a rosette with herbaceous leaves.

"Longisection" means a composite term of the phrase "longitudinal section." Ideally a lengthwise section taken down the center of a stem or branch tip. Typically magnified to enlarge details exposed by the section.

"Meristem" means the undifferentiated formative or generative cells of plants which give rise to daughter cells capable of further division, the cells found in the cambium or growing points capable of further development.

"Peduncle" refers to the stalk of a flower cluster or of a solitary flower.

"Radial symmetry" means the symmetry of a plant body, organ, or tissue which may be divided into two equal parts in any number of planes.

"Rosette" means: a. a dense, flat, imbricated cluster of leaves growing from a short stem at the base of a plant, as a dandelion; b. a collection of leaves growing close together and radiating from the main stem.

The term "species" is used in its broadest sense to refer to a particular plant thus is encompasses both the conventional definition of species and includes hybrids and varieties. In some instances, there may be multiple "varieties" within a species which may be separately identified or selected. "Hybrids," which are deliberate combinations of two species, are also commonly cultivated and may be separately identified or selected.

"Stem" means the main ascending axis of a plant bearing leaves or flowers or both.

"Succulent" means 1. describing a plant that stores water in enlarged, specialized spongy portions such as but not limited to, leaves, stems, or roots; leaf succulent a plant that uses the (thickened) leaves to store water; a plant with fleshy leaves. 2. of a plant, having fleshy and juicy tissues. 3. showing succulence. 4. succulents may be loosely grouped as stem succulents (including cacti), leaf succulents, root succulents, and caudiciform succulents. Stem succulents (most of which are cacti) have swollen, moisture-retaining stems, usually slender, oval, columnar, or spherical in shape. They may be climbing, pendent, or tree-like in habit; some resemble flat, leaf-like pads. Epiphytic succulents native to dry regions often produce aerial roots on their stems that absorb moisture from the atmosphere. Cacti are distinguished from other stem succulents by their unique growing points, known as areoles. Most lack foliage . . . (and) have ribs. Along the ribs are the areoles. Leaf succulents have foliage but often lack a stem, whereas cacti and other stem succulents have a swollen stem but mostly lack leaves. In both types stems or foliage expand when water is plentiful and contract or, in the case of foliage, drop away, in a drought.

"Trait cluster" as used herein refers to the overall, species-specific vegetative pattern and a concentrated view of several characteristics of the plant.

"Tree" means 1. woody perennial with a crown of branches developing from the top of a usually single stem or trunk. 2. a perennial plant having a permanent, woody, self-supporting main stem or trunk, ordinarily growing to a considerable height, and usually developing branches at some distance from the ground. 3. a woody plant with one main trunk and a more or less distinctly elevated head.

"Vine" means 1. the stem of a climbing or trailing plant, e.g. the stems of many species of Cucurbitaceae, etc. 2. any plant having a long, slender stem that trails or creeps on the ground or climbs by winding itself about a support or holding fast with tendrils or claspers. 3. or liana: an elongate, weak-stemmed, often climbing annual or perennial plant, with herbaceous or woody texture.

Additional terms related to computer-implemented methods according to the present invention may have the following definitions.

A "server" in a hardware configuration may be a computer such as a personal computer (PC) or other intelligent device. A server typically performs the bulk of the centralized or generalized tasks in the network and often has more memory, processing speed, and storage than the other device on the client-server network. Alternatively, the server may perform specialized tasks such as but not limited to, distributing electronic mail, data storage or printing. In the software arrangement, a "server" typically is a program that provides data, stores data, or provides some service to other programs to lo which the server is connected. A server may be a program with higher priority, greater memory, or greater capabilities compared to the other programs connected through the network. A server also may be a program that includes specialized capabilities or has higher priority with respect to certain tasks or functions.

A "client" in the software arrangement is generally a program used by a user. A client program typically makes use of data, processing, storage, or other resources of another program. A client may be used to communicate with a source or destination through a higher priority, more powerful, more capable or different program. The client may run on a computer such as but not limited to, a personal computer (PC), intelligent device, personal digital assistant (PDA) or workstation used by a user. In use, the client may carryout tasks in the process of which the client may request information or otherwise may use the resources of another object such as the server or another client to accomplish such tasks.

A "text prompt" is one of a set of two or more text phrases that can be used to select a particular branch in an algorithm (for example, a plant selection algorithm).

An "image prompt" is one of a set of two or more displayed images that can be used to select a particular branch in an algorithm (for example, a plant selection algorithm).

The terms "search criteria" and "sort criteria" may be used interchangeably herein.

EXAMPLES

The following examples are illustrative and not intended to be limiting of the invention.

Obtaining Images of Plant Species for a Plant Selection Database:

Various species of known plants were collected. Different species of plants, including annuals, bulbs, grasses, groundcovers, perennials, scrubs, vines, and wildflowers were collected. Some species were photographed in the field. Others were brought to the studio—either as a whole plant or a branch cutting. Typically, when working in the field, the photographic equipment was brought to the plant. When photographing potted plants in the field, the plant may be brought to the photographic equipment set up at a central location.

Photographic images for various components, views and profiles were obtained for a particular plant specimen. Depending on the nature of the specimen, a complete plant profile may be obtained or only certain limited views or profiles of the specimen may be obtained. A complete plant profile was usually obtained when a specimen was determined to be a member of a genus in which limited data has yet to be obtained. The complete profile was usually taken of the plant so that the plant's unique traits or characteristics could be clearly isolated and identified for use in the database. The data collection can be focused on those traits or combination of traits that may be useful in a database sort. In addition, a complete profile may be needed to confirm and cross-reference information from various sources of botanical literature, such as but not limited to, text or picture based references.

If a complete profile was desired, multiple photographs were taken of both the stem and any branches exhibiting a variety of growth characteristics. Variable growth characteristics may include various growing conditions or plant characteristics, such as but not limited to, whether the plant was dormant or under active growth.

The primary angle of the photographic images taken for the plant specimen was directly overhead of the stem apex and the branch apex.

Photographic images of the complete profile of the plant specimen may be obtained. The complete profile may include a side view image of the stem apex or the branch apex.

When a complete profile was sought and when photographing the plant in the field and, in some instances where the apex was obscured by vegetation, a side view photograph of the stem apex was acquired. The stem and/or branch were evaluated to determine the best lens to use in order to record all the vegetative details. Optionally, multiple images or photographs of different magnifications may be taken for each view of a plant species.

Photographs of the plants may be obtained with a standard or digital camera. Typically, the camera may be equipped with a 55-mm micro lens, or that same lens mounted in a standard fashion to 35-mm bellows. Various different lens may be used to obtain photographs. Occasionally, a 200-mm micro lens was used to record an inaccessible primary stem or branch.

Photographic images of different plant species may also be taken in a studio. In the studio, either a whole plant or a branch cutting was obtained and placed on an adjustable table. The table was positioned under various sources of light, such as but not limited to, natural light under either a skylight or where appropriate, outdoors. Various lighting methods are effective for photographing various plant structures as is known in the art photography of still subjects. The image is typically previewed in order to select the best lighting technique for the subject. The light source(s) may be placed at various angles from the plant to optimize contrast and resolution of the structural features of the plant.

Whether the photographic images were obtained in the field or in the studio, the procedures are similar. First, a camera on a tripod was set up in a manner such that the lens was close to the plant structure, such as within a few inches of a branch apex or a stem apex. A light meter reading was taken. Optionally, color meters and color filters may be used to obtain the images. Appropriate light filters were attached to the lens as needed. Adjustments were made to bring the plant structure, such as but not limited to, the apex into focus in the viewfinder. The view was assessed to determine if all of the key vegetative details were in focus, and adjustments were made as needed. Adjustments may include expanding or contracting the bellows, or removing them. The depth of field of the image was evaluated and adjusted.

In some instances, specific structural details of the plant structure to be obtained may be isolated from adjacent features by shortening the depth of field. In other instances, vegetative data could be recorded by using the greatest possible depth of field. After all adjustments were made, the photograph was taken using various sources of films or recording medium such as but not limited to, electronic/digital media, color, black and white print or slides. Under certain applications where it is more convenient to store images of prints or slides in digital format, the prints may be scanned and saved in digital format.

A variety of methods and procedures for capturing and storing images, such as but not limited to, images of plant structures, in electronic or digital format are well known in the art. In certain applications, a commercially available still digital camera may be used, and a digital memory storage unit may be used to capture and store digital data, images and photos. The data stored may be readily transferred to a computer for further data processing and manipulation.

Color, black and white prints or slides may be used to capture images of the plant species. Preferably, color images such as but not limited to, slides or prints may be taken of the plant species. Typically, 35-mm slide film may be employed. In many applications, standard commercially available films that provide high picture resolution may be used. In some applications, for example, Kodak E100S film was used.

In some applications, multiple cameras are mounted in the studio to project at different angles to the plant specimen to obtain multiple images of profiles and views at the same time without the need to adjust and move a single camera to obtain different views of the same plant species. For example, a first camera may be set up over head to obtain images of the apical complex of the plant while a second camera may be directed perpendicular to the view of the first camera such that the view of the stem or a branch of the plant species may be obtained. This method for simultaneously obtaining multiple views of a plant species allows a facile and efficient compilation of a large number of plant specimens without the need for rearranging a single camera to capture multiple views.

Different information associated with particular characteristics of each plant correlating to the images taken of the plant may be recorded in a searchable database record. For example, dated and numbered field information may be recorded for each image of the plant species taken. The characteristic information relating to the plant specimen may include: the date and time of year that the specimen was taken, the date the specimen was photographed; the plant genus, species and common name (if known), the physical location where the plant was obtained from, including the city, state and country, the owner of the plant, the planting bed and/or greenhouse location, the profiles, light sources, magnification, specimen scale (size, height), and the film roll number or slide number. The information corresponding to the unique identity of the plant specimen is stored in a particular field associated with the specimen and the data is stored in a database. The database may be stored in an electronic format that is readily amended, supplemented, and searchable.

Detailed measurements of the plant may be optionally recorded, including for example the size of the plants. Where exposed film format was employed, the film was developed into slides or prints. The slides or prints may be further stored in digital format.

The slides, prints or electronic images were organized for ease of search and retrieval. For example, the slides were organized in numerical or alphanumerical order and placed in binders in archival slide jackets. The numbers imprinted on the slides were compared to those in field notes; adjustments or correlation of the slides with the field notes were made as needed. Where feasible, the slides were compared to other slides taken of the species. Optionally, a selection of slides containing specific plant structures was chosen for enlargement. Where no digital images were previously obtained, the sorted slides were scanned using a high resolution scanner and the data stored in digital format.

The black border around each scanned slide image was cropped from the image. The image was identified with a unique identification code and stored electronically. Optionally, the information may be printed for further review or for storage and retrieval. The print was labeled with the specific roll number and slide or print number, and when known, the name of the plant's genus and species, inserted in a plastic sleeve, and organized alphabetically. When a sufficient number of images were collected from a variety of sources, comparisons may be made.

The general guides which govern the plant kingdom dictate the production of a specific set of features on each plant that is a member of a particular species. By comparing images from differing sources and growing conditions, a set of species-specific characteristics could be determined and the photographic methodologies refined. Different sources and conditions in which the plants are obtained is of significance because plants survive in a broad range of growing conditions, and the extreme conditions will frequently expose the minimum set of characteristics of the plant that the plant will retain. For example, under more favorable growing conditions for a particular plant, the plant will exhibit certain characteristics that are not observed under different conditions. For example, the spine shield of a species may not be as dried or atrophied in favorable growing conditions in a particular environment. Therefore, a minimum set of characteristics will be revealed and captured when a comparison is made of images from different plant specimen, sources, and growing conditions. These methodologies may be adjusted and updated as needed in order to capture the salient characteristics of different species obtained under different conditions.

Referring now to FIG. 1, a still further embodiment of the present invention will now be described. As an extension of plant identification, the database of the present invention may also be effectively used for plant selection. By way of example and not limitation, a customized guided search may be used by a user to select a plant that exhibits certain characteristics desired by a user of the system. In one embodiment, the system may enable users to select a plant using vegetative traits and a single photograph, preferably showing the apical complex of a species. A user-friendly format using the various search guides may assist those who desire to navigate the plant kingdom. This may be particularly useful and uniquely organized to help user's make landscaping decisions and plant selection to meet particular landscaping needs.

The plant selection guide is provided with a plurality of search criteria, as desired. In one embodiment, a plant selection guide is provided with 34 search criteria, as shown below. Auxiliary search criteria can be provided within the selection process, for example, but not limited to, rapid growing, attracting bees, self-propagating, etc. Further, the plant selection guide enables users to compound the search criteria, empowering them to refine a landscaping selection to meet extremely precise zonal, aesthetic, and/or cultural needs.

Additionally, features that enhance the user's understanding of the plant kingdom can be added to the knowledge database. By way of example and not limitation, this understanding can be accomplished by adding the following features to the database: 1) a complete photo-illustrated glossary, including leaf types, 2) a list of synonyms to aid the user in navigating a sort, and 3) the gradual addition of photographs of each species showing apical complex and trait clusters. For example, the search criterion "plant type" includes the following types of plants, whose definitions can be included in a knowledge database:

1. Aquatic A plant that requires excessive moisture in order to thrive.

The ground or pot in which they grow is very wet, soggy, or pooling.

2. Vine A plant with slender stems (woody or soft) that grows along the ground or climbs on another plant. Many will support themselves by winding around another plant or structure and grasp with either tendrils or fibrous root-like growths that grasp the support.

3. Ferns A non-flowering evergreen or deciduous plant often with feather-like fronds (leaf-like vegetation) generally growing from a central point. Most ferns have fronds emerging from a central point at ground level, some form a trunk, appearing much like a small feathery palm tree.

4. Insectivores A plant adapted to feeding on insects by trapping them with fly trap (hinged), pitcher-shaped, or sticky tentacular leaves.

5. Orchids A huge family of plants cultivated for and recognized by, its complex, showy, long-lived flowers. When not in flower, some of them can be recognized by their sympodial or monopodial growth habits, a fairly simple leaf structure, and the presence of aerial or exposed roots. The most common species are sympodial in which new growth emerges from a ground level horizontal rhizome first creating a pseudobulb with persistent leaves emerging from the top of the pseudobulb. These species usually have conduplicate leaves which are smooth, thick, entire, leathery, lance-shaped green leaves with a center fold and parallel veins. Others have plicate leaves—multi-folded, like a fan. In monopodial species, the leaves emerging from the top of the previous years growth. These species usually have simple leaves as well (non-fan-shaped).

6. Cactus Typically a succulent, leafless, spiny plant with a thick, fleshy stem. Some have a branching pattern, others form a single column, a single globe, or a cluster of globes. Most have spines and a distinct growing point called an "areole" spread over the surface of the stem, from which the spines emerge. The most familiar are the large Saguaro columnar species typical of the American southwest, or Opuntias, a group recognized by their "pads" and shrubby branching habit. Most grow in hot, arid regions of the Americas.

7. Grass A large group of plants with round, usually hollow stems frequently distinguished by their regularly spaced nodes or joints. These plants are also characterized by their sheathing leaves that wrap around the stalk. Many are grown and used for grazing. Bamboo and hay are both grasses.

8. Sub-shrubs A small perennial shrub, typically with soft pliable leaves (herbaceous) or soft-wooded. Some grow under the shadow of larger plants, others in full sun.

9. Shrubs A woody plant lacking a trunk with multiple stems emanating from the base. Some are quite large. Most are smaller than a tree.

10. Palms Most are medium-sized to tall unbranched trees with a crown of large distinct "palm" leaves (large pinnate or palmately cleft leaves). Most are unbranched and have leaves clustered at the top of the trunk. Many have a bare, smooth-barked trunk, others have a coarse trunk comprised of the persistent base of old fronds.

11. Tree A large woody perennial plant usually with a single self-supporting stem or trunk. The top is usually covered with numerous spreading branches. Some have persistent leaves, some loose a few leaves on a regular basis, others are deciduous and loose their leaves each year.

In one embodiment of the plant selection system 700, each numbered category can be selected or deselected. Each selection creates a list of plants, further narrowed by each selection. A synonym list accompanies the glossary; accessible at all times during the search. Visual/photographic references can also be accessed during the search. A saved search can be loaded. A list of selected plants can be saved and compiled.

By way of example and not limitation, one potential starting point for a guided search uses 1) Climate zone/region (select location of parcel/garden from list). This may quickly reduce the number of plants that qualify in the remaining selection pool. The climate or zone may be determined in a variety of ways. The system may prompt the user to enter their zip code or other numerical location identifier. Another embodiment may use text entry of city, state, and/or country. Still others may prompt the user for broader geographic information such as but not limited to southwestern United States, eastern Canada, or other larger regions. Other embodiments may extract location information for user profile information that a user enters when they initially register as users of the plant selection system or the plant identification system. Others may use GPS information to provide location. This may be particularly useful in handheld units.

Some embodiments may or may not include the climate zone or region selection. In any case, the next selection step may involve sequentially traversing the selection tree shown in FIG. 1. The search may traverse down each tree and then down the next tree. Others may allow for the search to proceed across levels. For example, the search may involve selection of plant cultivation, plant size, and plant type as they are all on the same "level" for the plant selection.

By way of example and not limitation, some potential choices for each search criterion may include:

Plant cultivation (introduced/cultivated, cultivated native, native);

Plant growth habit (climbing, tree, shrub, sub-shrub ground cover, etc.);

Plant size (<1 m, 1-3 m, 3-10 m, >10 m);

Plant type (aquatic, vine, tree, shrub, sub-shrub, cactus, ferns, insectivores, orchids, grass, palms, etc.);

Leaf habit (evergreen, deciduous);

Growth habit (annual, perennial, biennial);

Plant leaf size (<1 cm, 1-3 cm, 3-10 cm, >10 cm);

Plant leaf shape (lobed, palm-like, frond, smooth edge, toothed, blade, scale);

Plant leaf type (single, compound);

Plant form/habit (dense [e.g., conifer, topiary, hedge, barrier], airy/arching, grassy, rosette [e.g., stiff, succulent, leafy]);

Plant primary attributes/uses (showy flower, not-showy flower, foliage color, flower color, spring color, fall color, winter grower, etc.);

Foliage (stiff, rosette, leathery leaf);

Landscaping trait (shade-providing, wind-sheltering, lawn, erosion control, etc.);

Soil conditions (well-drained, acid, sterile, stony, sandy, damp/wet);

Microclimate (windy, drought-resistant, warm, sunny, shady, humid);

Special use characteristics (edible [e.g., fruit, vegetable, herb, seasoning, seed, root], container, bonsai, etc.);

Nuisance (invasive, weed, noxious, etc.);

Threatened/endangered;

Collected;

Specimen;

Scented (vegetation, flower, evening, crushed);

Attracts wildlife (animals, insects);

Disease resistant;

Insect resistant;

Deer resistant;

Naturalizes;

Maintenance needs (urban/low maintenance, high maintenance);

Garden style use (formal, casual/cottage, wild, rock, arbor, sheltered, greenhouse);

Preferred propagation method (seed, bulb, cutting, division, hybrid, other);

Propagation ease by seed (easy, requires special equipment, difficult/expert);

Propagation ease by cutting (easy, requires special equipment, difficult/expert);

Propagation ease by division (easy, requires special equipment, difficult/expert);

Propagation ease by hybridization (easy, requires special equipment,
ifficult/expert);

Accessibility (common, specialized growers, rare/difficult to find);

Availability (seasonal, year-round).

Figure 2:
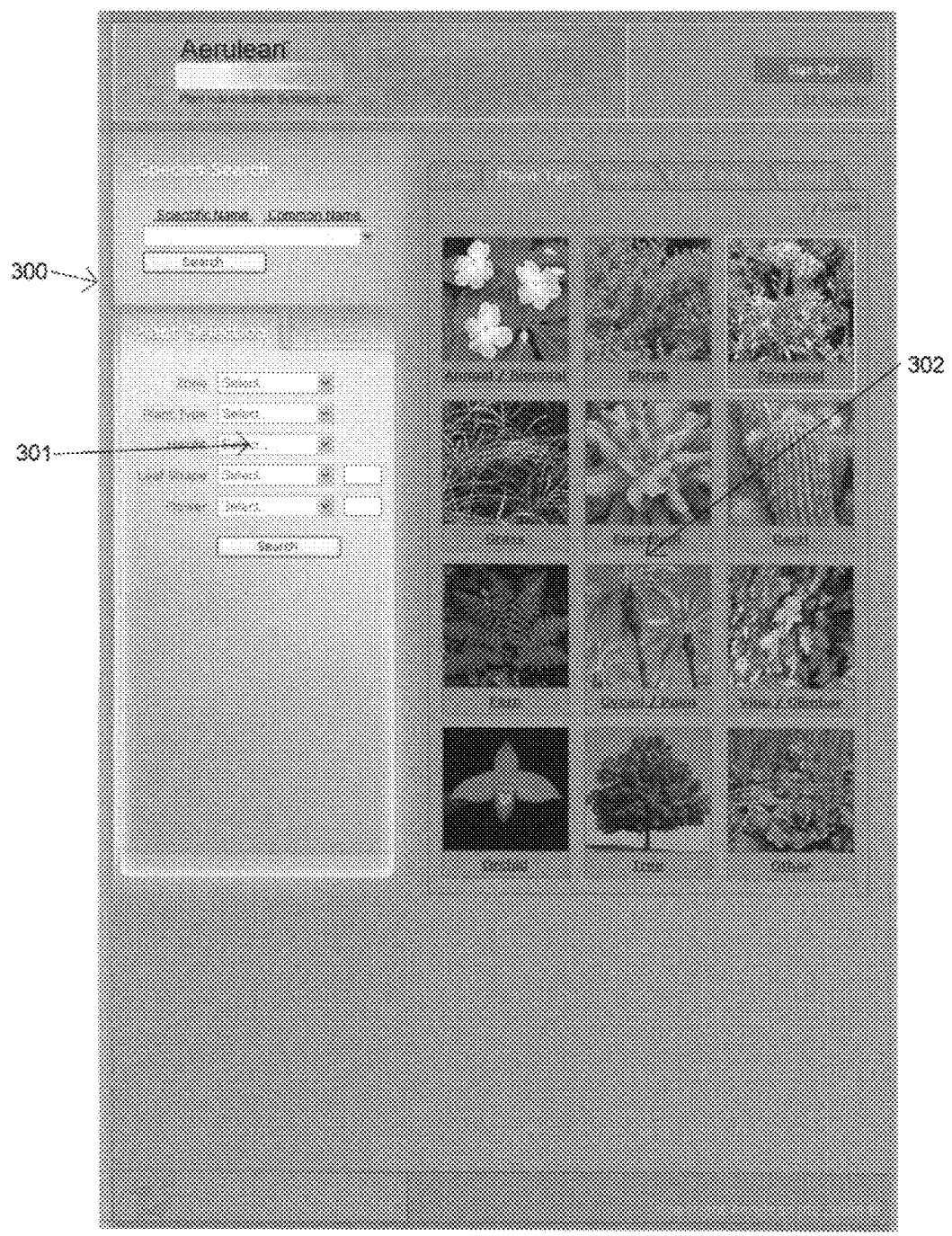
FIG. 2 shows one embodiment of a starting screen for plant selection.
Figure 3:
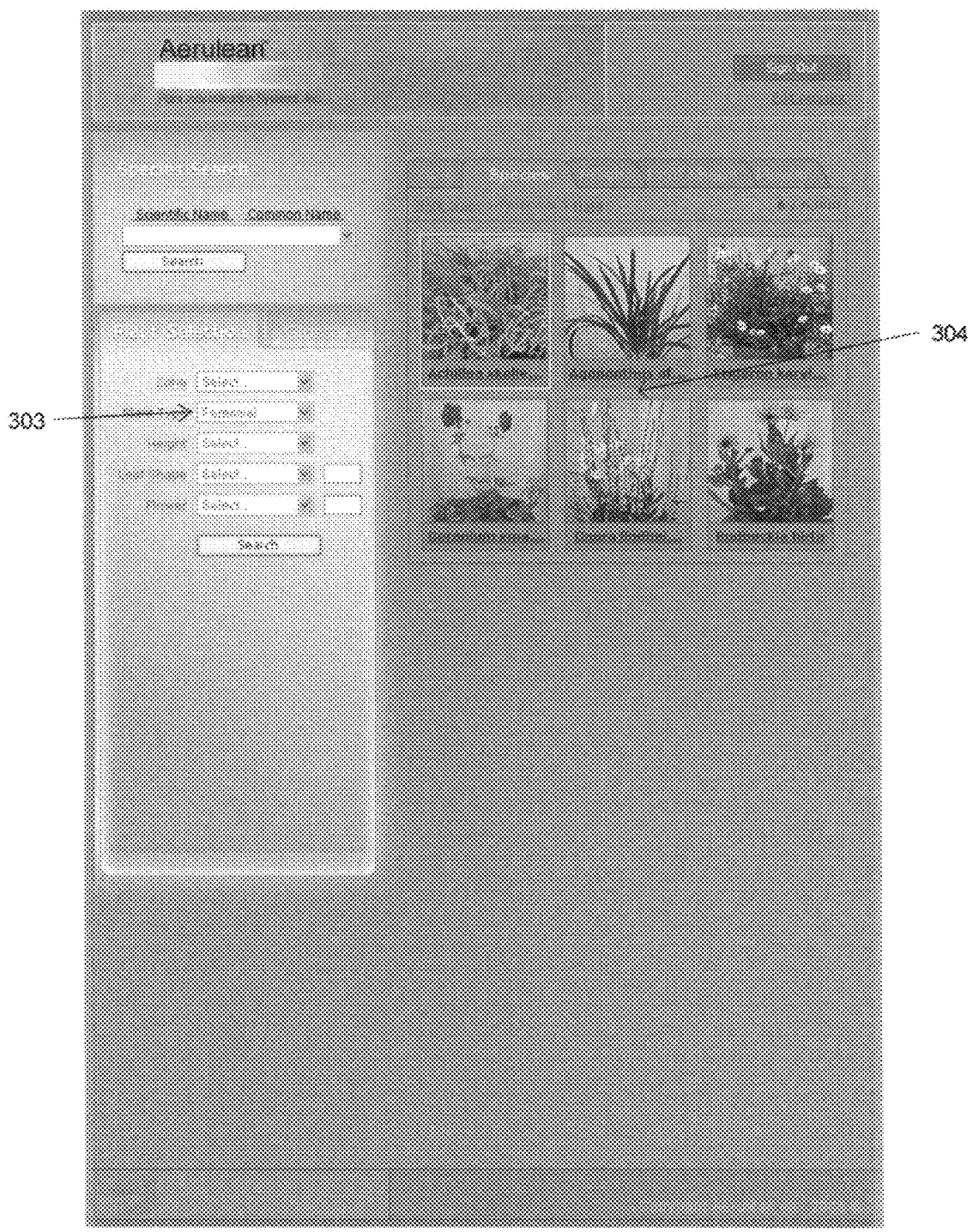
FIG. 3 shows an example of an intermediate screen during a plant selection session.
Figure 4A:
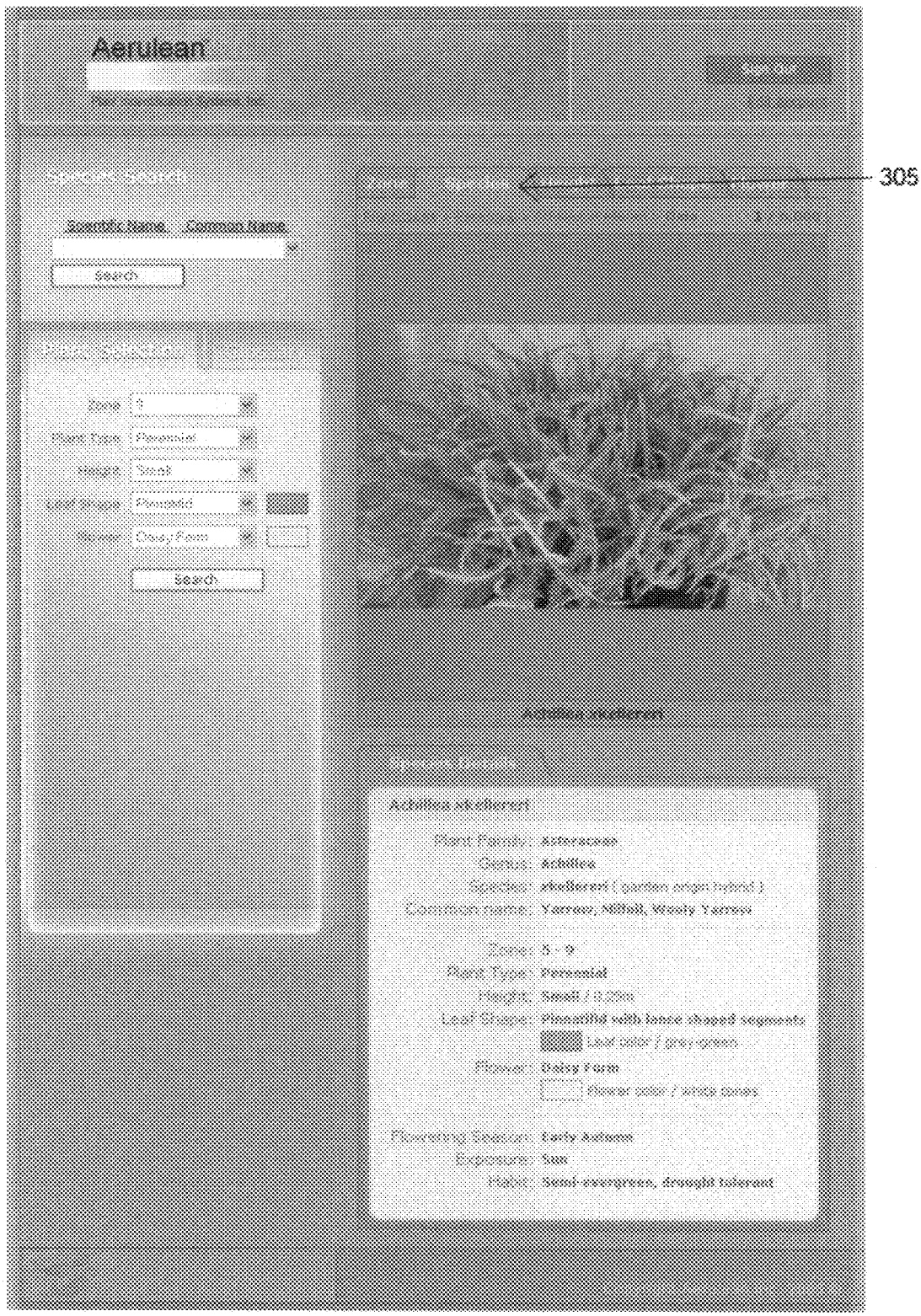
FIGS. 4A-D show examples of different views of a plant species at the end of a plant selection session.
Figure 4B:
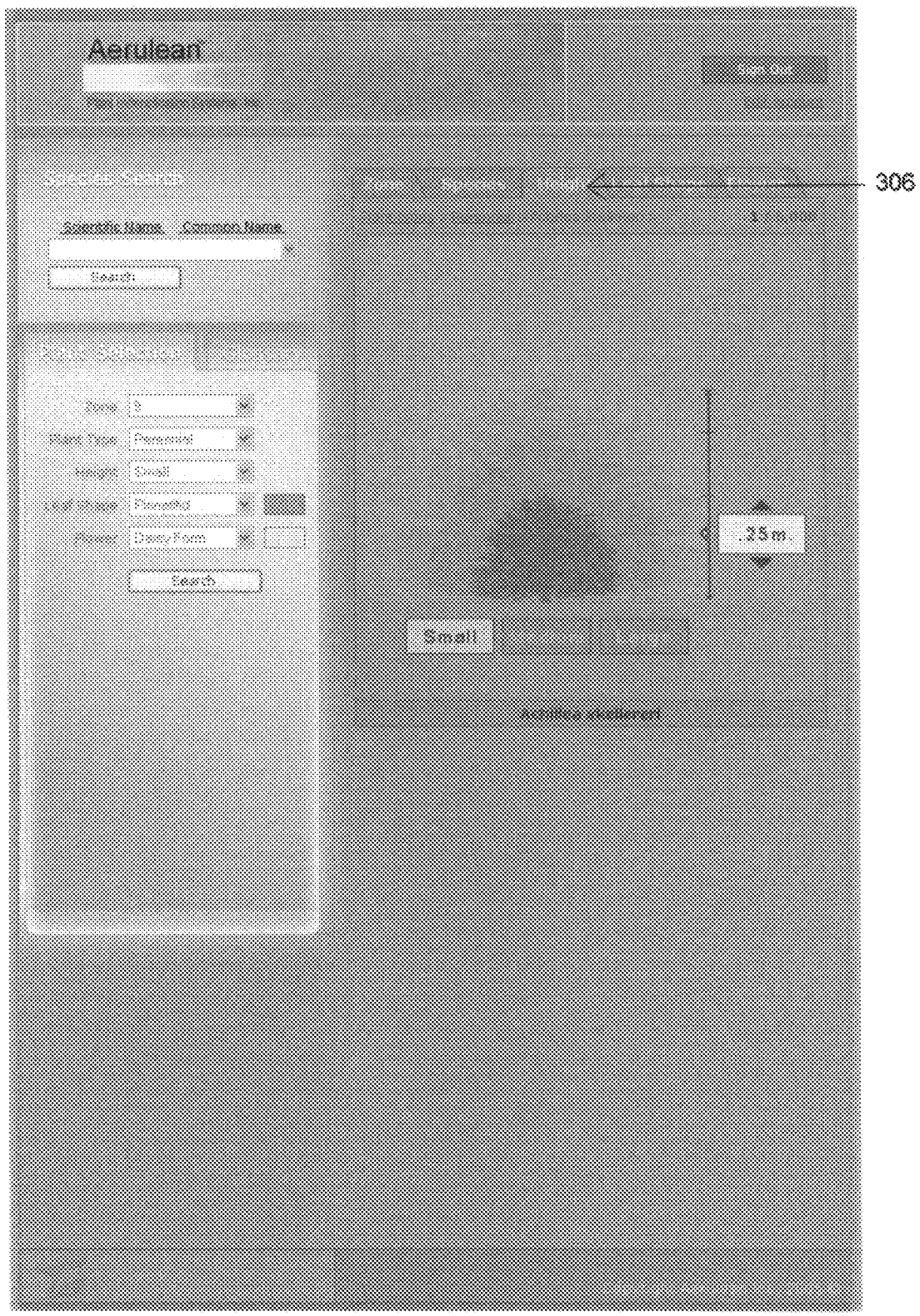
Figure 4C:
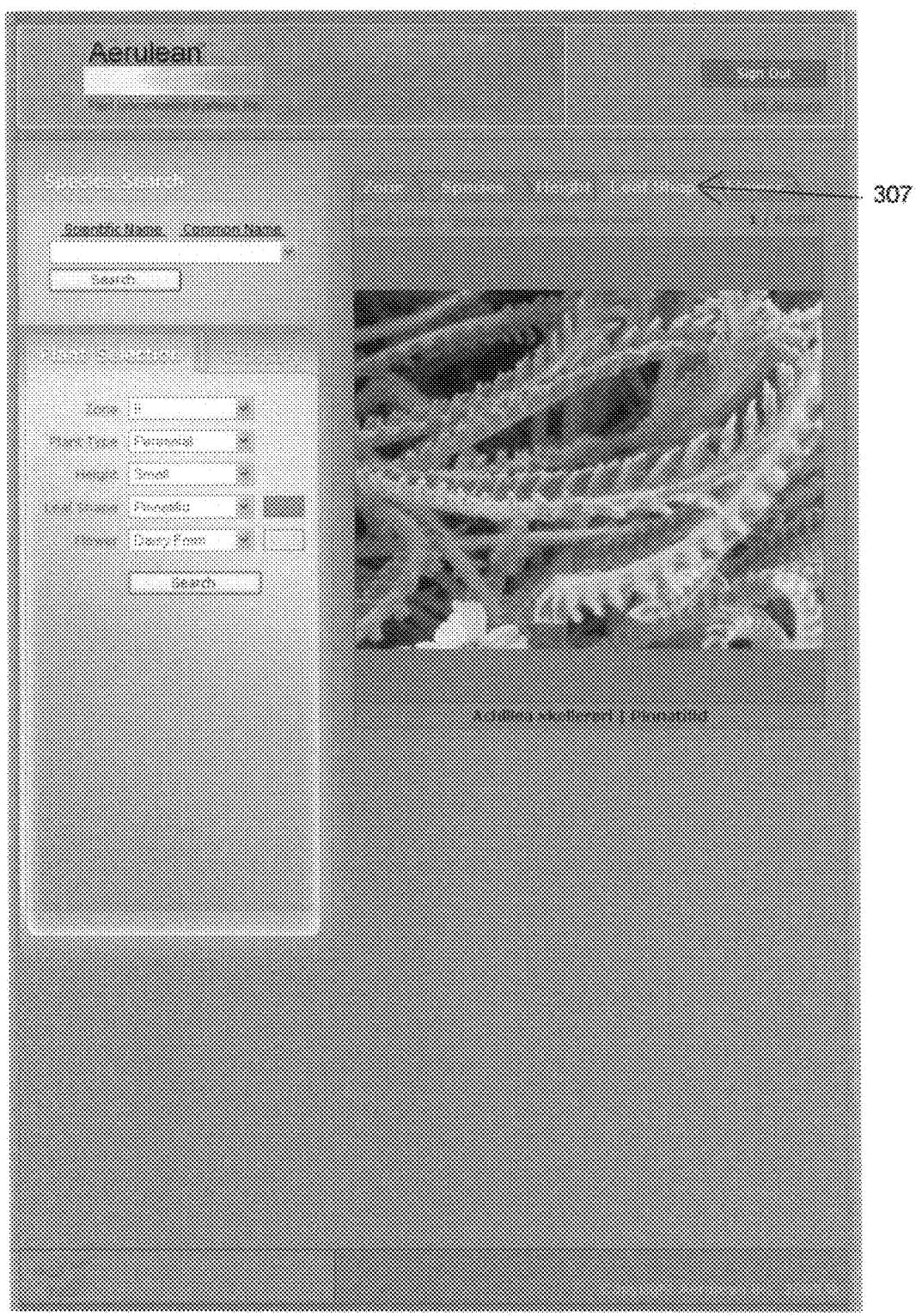
Figure 4D:
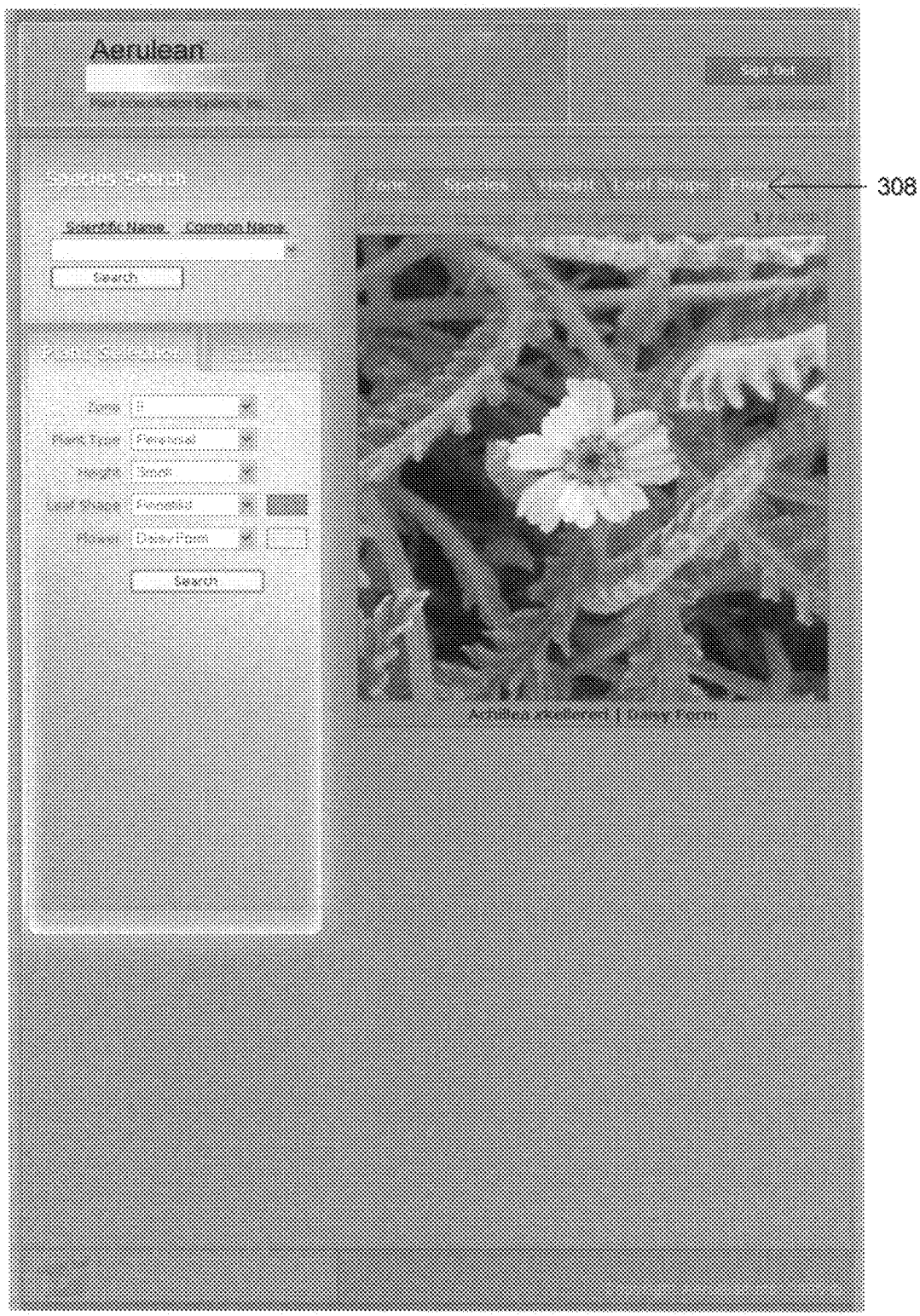
Figure 5:
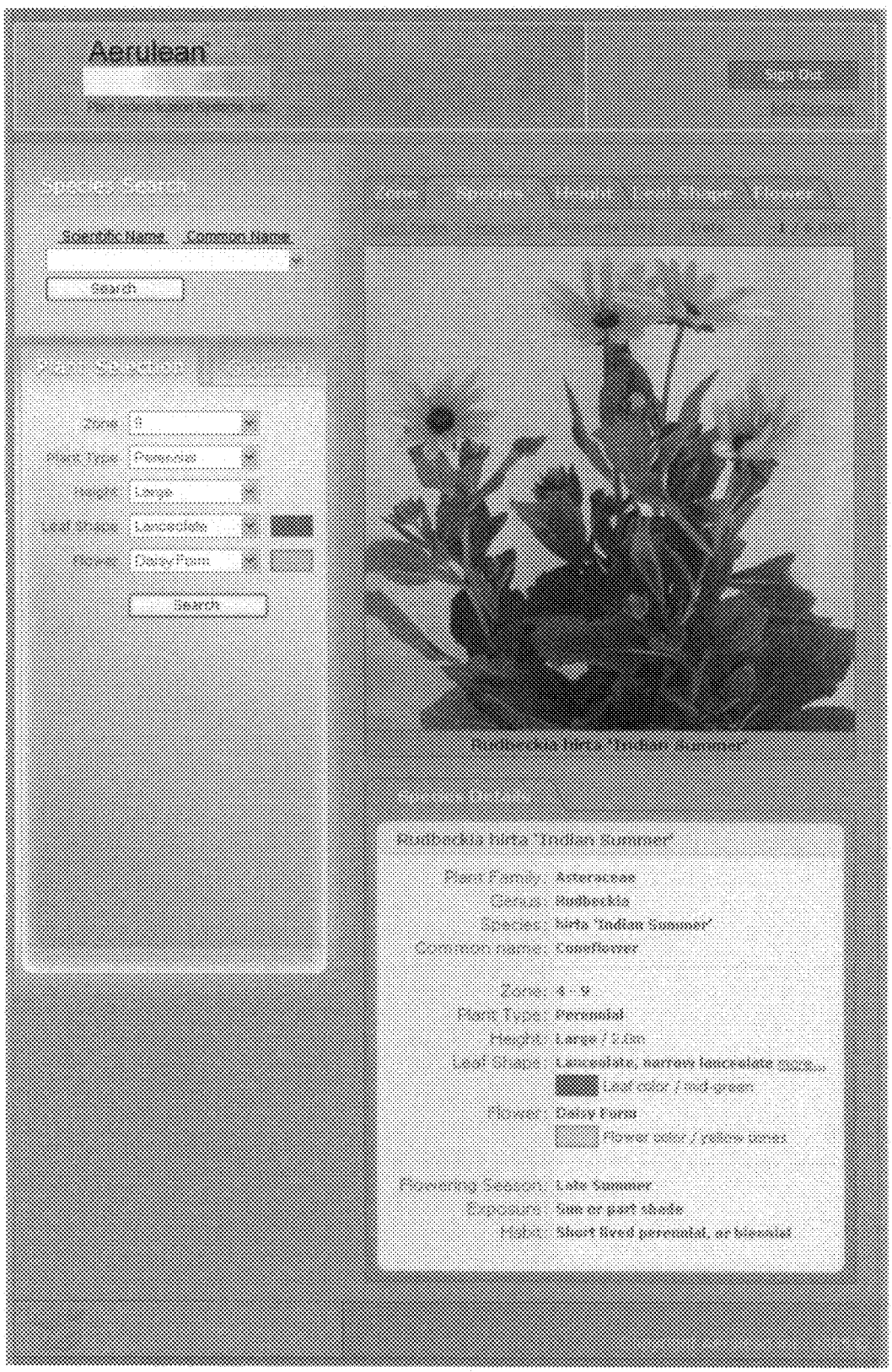
FIG. 5 shows another example of a screen display at the end of a plant selection session.
Figure 6A:
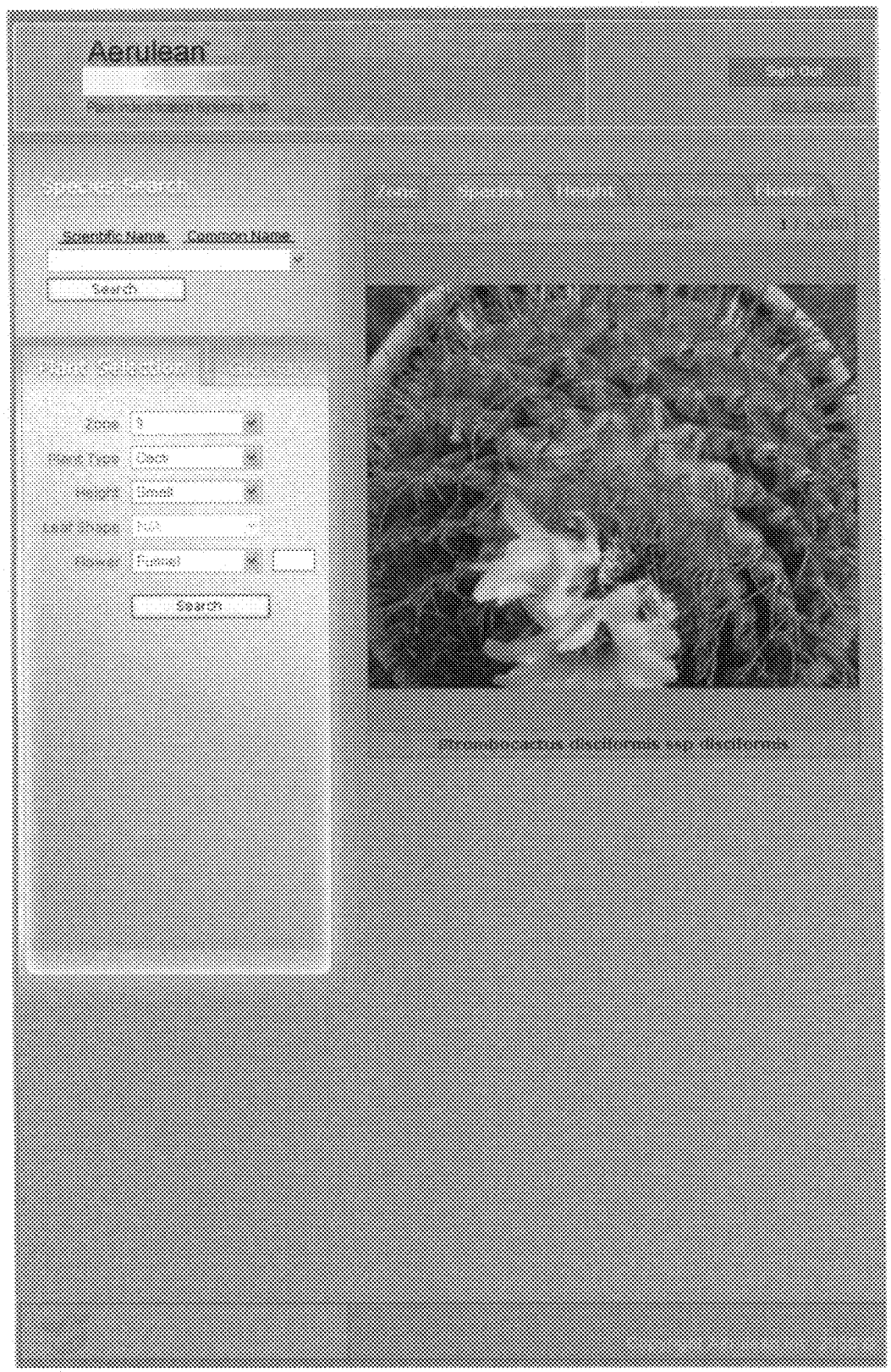
FIGS. 6A and 6B show yet another example of different views of a plant species at the end of a plant selection session.
Figure 6B:
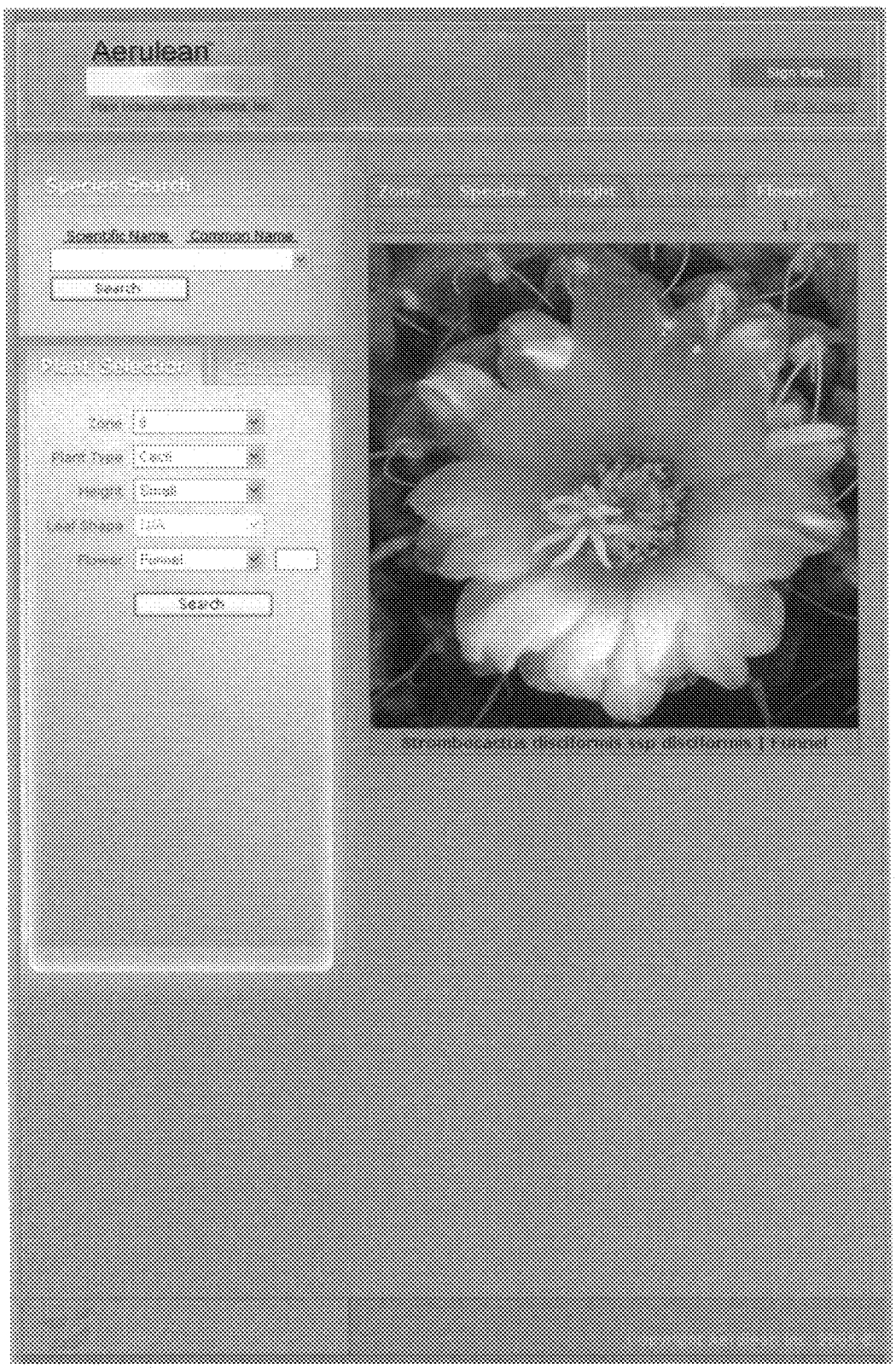

FIGS. 2-6 illustrate a typical plant selection session. FIG. 2 shows a sample start screen 300 for a plant selection session. The user is presented with a set of selection criteria as both text prompts in block 301 and image prompts in block 302. In FIG. 3, the user has begun to narrow the selection by choosing the "perennial" plant type in block 303. A new set of image prompts is presented in block 304. After making further selections of Zone 9, "small" height, "pinnatifid" leaf shape, and "daisy form" flower, a single plant selection is found. Four views of the selected plant for this example selection are shown in FIG. 4A-D by selecting the appropriate tab 305, 306, 307, or 308. Another example of a single plant selection result screen is shown in FIG. 5, where the user has changed to "large" height and "lanceolate" leaf shape. Still another example of a single plant selection result screen is shown in FIGS. 6A and 6B for a "small" "cactus" with "funnel" flowers, where two views are shown illustrating the apical complex ("species") view in 6A and the "flower" view in 6B.

Figure 7:
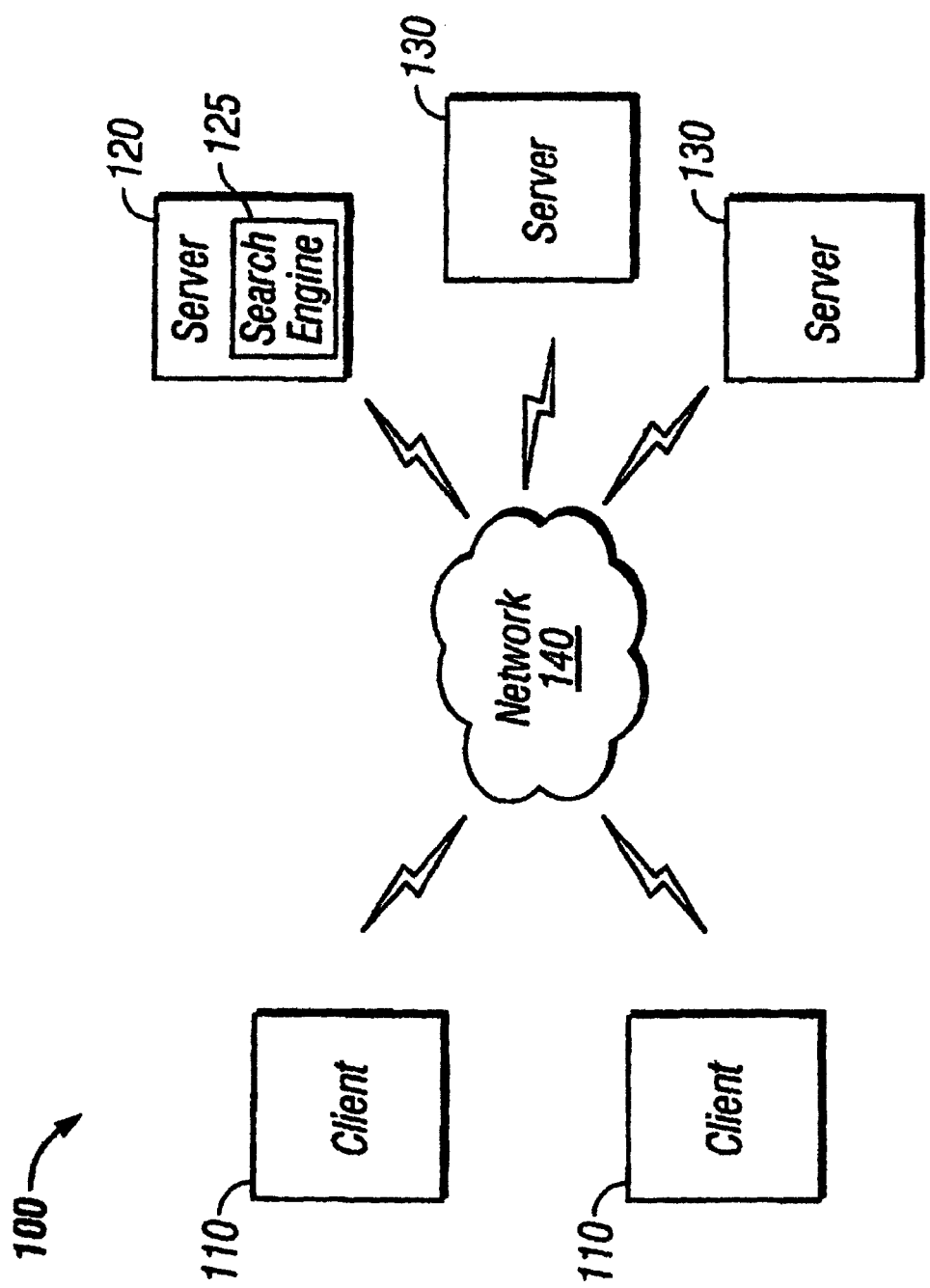
FIGS. 7 and 8 show the overview of one embodiment of a computer network and computer for use with the present invention.

FIG. 7 illustrates a system 100 in which methods and apparatus, consistent with the present invention, may be implemented. The system 100 may include multiple client devices 110 connected to multiple servers 120 and 130 via a network 140. The network 140 may include a local area network (LAN), a wide area network (WAN), a telephone network, such as but not limited to the Public Switched Telephone Network (PSTN), an intranet, the Internet, or a combination of networks. Two client devices 110 and three servers 120 and 130 have been illustrated as connected to network 140 for simplicity. In practice, there may be more or less client devices and servers. Also, in some instances, a client device may perform the functions of a server and a server may perform the functions of a client device.

The client devices 110 may include devices, such mainframes, minicomputers, personal computers, laptops, personal digital assistants, or the like, capable of connecting to the network 140. The client devices 110 may transmit data over the network 140 or receive data from the network 140 via a wired, wireless, or optical connection. By way of example and not limitation, client devices may be connected to the network 140 via dial-up, ISDN, DSL, cable, satellite modems or the like, via wireless network interface hardware, or the like. In one configuration, the plant selection database is stored on a server 130 and the users of client devices 110 may access the database through a web interface or via a client running on the client device 110.

Computer network 140 is typically a wide area network (WAN) such as but not limited to, the Internet, or the like. In this embodiment, computer network 140 may use communication protocols such as but not limited to, TCP/IP, RTP, RTSP, or the like for the transfer of data. In other embodiments, computer network 140 may be a local area network (LAN), based upon TCP/IP, IPX, or the like. Data communication may include transfer of HTML based data, textual data, form submissions, plug-in programs or viewers, applets, packetized audio or video data, real-time streaming data, and the like. Although computer network 140 is illustrated as a single entity, as is the case with the Internet, it should be understood that computer network 140 may actually be a network of individual computers and servers. The plant selection database of plant images and text information may be stored in a distributed manner over a plurality of servers or alternatively, all on one server.

Figure 8:
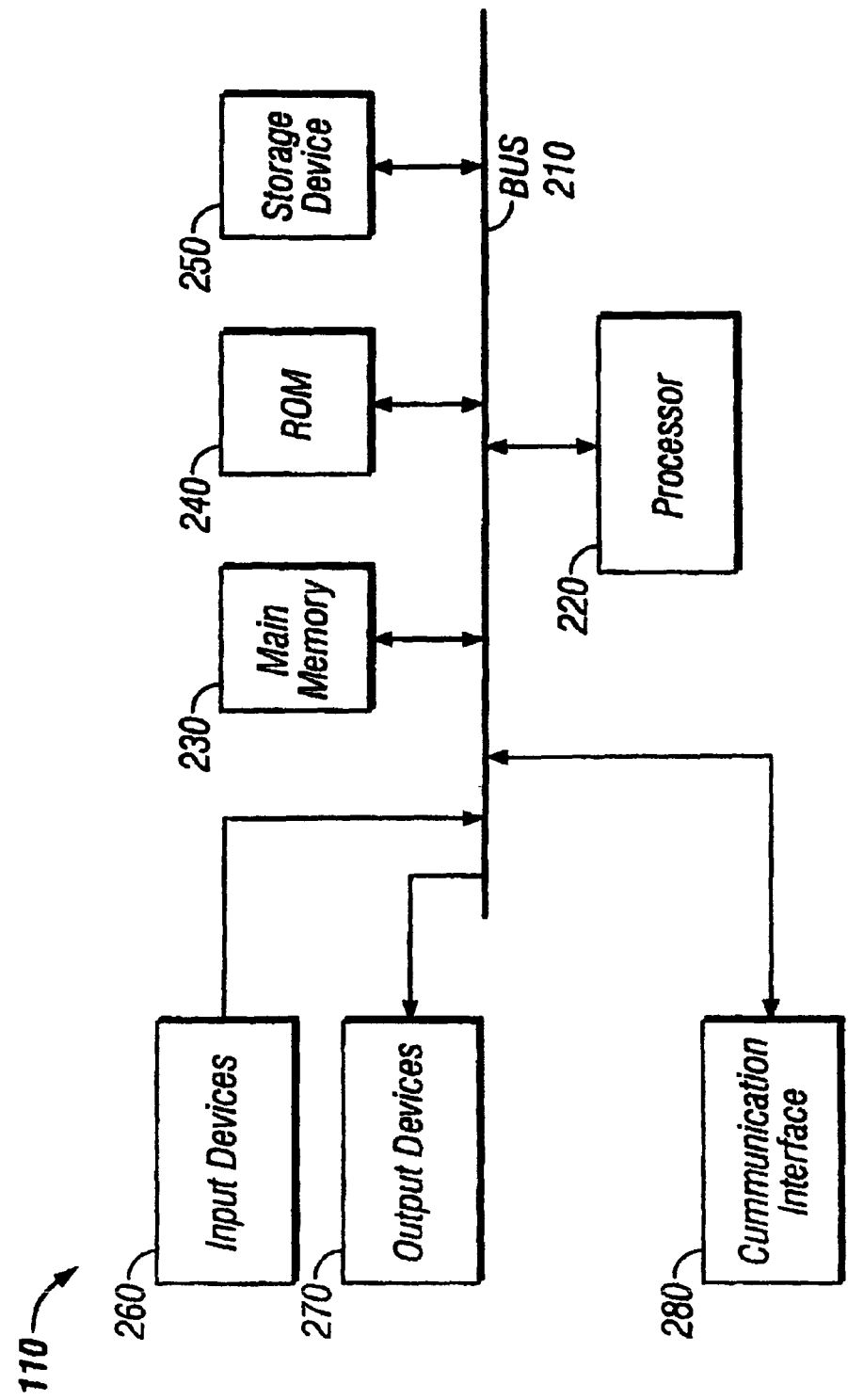

FIG. 8 illustrates one embodiment of a client device 110 consistent with the present invention. The client device 110 may include a bus 210, a processor 220, a main memory 230, a read only memory (ROM) 240, a storage device 250, an input device 260, an output device 270, and a communication interface 280.

The bus 210 may include one or more conventional buses that permit communication among the components of the client device 110. The processor 220 may include any type of conventional processor or microprocessor that interprets and executes instructions. The main memory 230 may include a random access memory (RAM) or another type of dynamic storage device that stores information and instructions for execution by the processor 220. The ROM 240 may include a conventional ROM device or another type of static storage device that stores static information and instructions for use by the processor 220. The storage device 250 may include a magnetic and/or optical recording medium and its corresponding drive. Images of plant species may be stored at the server 130. The user may optionally download searches and plant species images to the local computers or client device 110.

The input device 260 may include one or more conventional mechanisms that permit a user to input information to the client device 110, such as but not limited to, a keyboard, a mouse, a pen, voice recognition and/or biometric mechanisms, etc. The output device 270 may include one or more conventional mechanisms that output information to the user, including a display, a printer, a speaker, etc. The communication interface 280 may include any transceiver-like mechanism that enables the client device 110 to communicate with other devices and/or systems. For example, the communication interface 280 may include mechanisms for communicating with another device or system via a network, such as network 140.

In one embodiment, client device 110 is a PC compatible computer having an x86 based microprocessor, an Athlon microprocessor from Advanced Micro Devices, Inc, or the like. Further, in the present embodiment, client device 110 typically includes a Windows operating system such as but not limited to, WindowsME, WindowsNT, Windows XP, or the like from Microsoft Corporation.

RAM and disk drive are examples of tangible media for storage of data, audio/video files, computer programs, browser software, embodiments of the herein described invention, applet interpreters or compilers, virtual machines, web pages, databases such as but not limited to, Oracle 8i, and the like. Other types of tangible media include floppy disks, removable hard disks, optical storage media such as but not limited to, CD-ROMS and bar codes, semiconductor memories such as but not limited to, flash memories, read-only-memories (ROMS), battery-backed volatile memories, and the like. In embodiments of the present invention, such as but not limited to, set top boxes, mass storage, such as but not limited to, disk drive, and the like may be dispensed with.

In the present embodiment, client device 110 may also include software that enables communications over a network such as but not limited to, the HTTP, TCP/IP, RTP/RTSP protocols, and the like. In alternative embodiments of the present invention, other communications software and transfer protocols may also be used, for example IPX, UDP or the like.

FIG. 8 is representative of types of computer systems for embodying the present invention. It will be readily apparent to one of ordinary skill in the art that many other hardware and software configurations are suitable for use with the present invention.

For example, other types of processors are contemplated, such as but not limited to, Pentium™ class, Celeron™-class, or other microprocessors from Intel Corporation; PowerPC G3, G4 microprocessors from Motorola, Inc.; Crusoe™ microprocessors from Transmeta, and the like. Further, other types of operating systems are contemplated, such as but not limited to, Solaris, LINUX, UNIX, MAC OS from Apple Computer Corporation, and the like. In still other embodiments, set top boxes such as but not limited to, the PS2, X-Box, WebTV, and the like may also be used.

As will be described in detail below, the client devices 110, consistent with the present invention, perform certain searching-related operations. The client devices 110 may perform these operations in response to processor 220 executing software instructions contained in a computer-readable medium, such as but not limited to, memory 230. A computer-readable medium may be defined as one or more memory devices and/or carrier waves. The software instructions may be read into memory 230 from another computer-readable medium, such as but not limited to, the data storage device 250, or from another device via the communication interface 280. The software instructions contained in memory 230 causes processor 220 to perform search-related activities described below. Alternatively, hardwired circuitry may be used in place of or in combination with software instructions to implement processes consistent with the present invention. Thus, the present invention is not limited to any specific combination of hardware circuitry and software.

The servers 120 and 130 may include one or more types of computer systems, such as but not limited to, a mainframe, minicomputer, or personal computer, capable of connecting to the network 140 to enable servers 120 and 130 to communicate with the client devices 110. In alternative implementations, the servers 120 and 130 may include mechanisms for directly connecting to one or more client devices 110. The servers 120 and 130 may transmit data over network 140 or receive data from the network 140 via a wired, wireless, or optical connection.

The servers may be configured in a manner similar to that described above in reference to FIG. 8 for client device 110. In an implementation consistent with the present invention, the server 120 may include a search engine 125 usable by the client devices 110. The servers 130 may store documents (or web pages) accessible by the client devices 110.

Secure connections from the client to the server may be implemented. In such an embodiment, communication between these servers may be via a virtual private network (VPN), or other secure protocol, such as but not limited to, an SSL or HTTP.

By way of example and not limitation, the application of the present invention for plant selection may be implemented within a framework of an Application Service Provider (ASP) system embedded in a central server computer platform 130 having a network interface. Server platform 130, can be a single workstation computer such as a PC, a mainframe computer or a collection of computers interconnected by a local or wide area network. Server platform 130 is capable of handling web-enabled technologies by means of web server application such as BEA WebLogic Server which supports Hypertext Transfer Protocol (HTTP). Such technologies include for example Java applets, JavaScripts, HTML, DHTML, XML, and the like on the client side, and Servlets, Java Pages (JSP) and Enterprise Java Beans (EJB) and the like on the server side. A user of the system communicatively interfaces over a data communication network, such as the Internet or Intranet, to central server 130 by conventional communication devices such as a modem, a network card and the like, using a software application, i.e., Web Browser (e.g., Microsoft Explorer, Netscape Navigator). A user may access server 130 via other software applications such as a client software application on client 110 specifically designed to interact with server 130. By way of example and not limitation, Web Browser is shown as the preferred embodiment in this document. Through the browser (in association with a display device and input devices such as a keyboard and mouse), a user can upload data into server 130 and can request and receive dynamic on-line information and services from the different server modules. For example and not limitation, the user may access the plant selection system. The system may also be configured to allow users to submit new plant species to the plant database (which may be pending approval by system administrator). It will be readily appreciated that server 130 may be located on a local area network within the organization of the user. Similarly it will be readily appreciated that a user may access server 130 not directly from user system but from other "on the road" computing devices such as laptops, personal data assistance units and the like. The person skilled in the art will appreciate that other methods of data input and transmission between the user and server 130 are contemplated by the present invention. In yet another embodiment of the present invention the server 130 may reside within a user system or within an Intranet or local area network relating to user for local or single use by a user or a group of users. Alternatively, the various components of the system may reside on various computers in a distributed network providing the same functionality as shown in this invention. Said various computers may be at any location as long as they are connected via a suitable data link.

Figure 9:
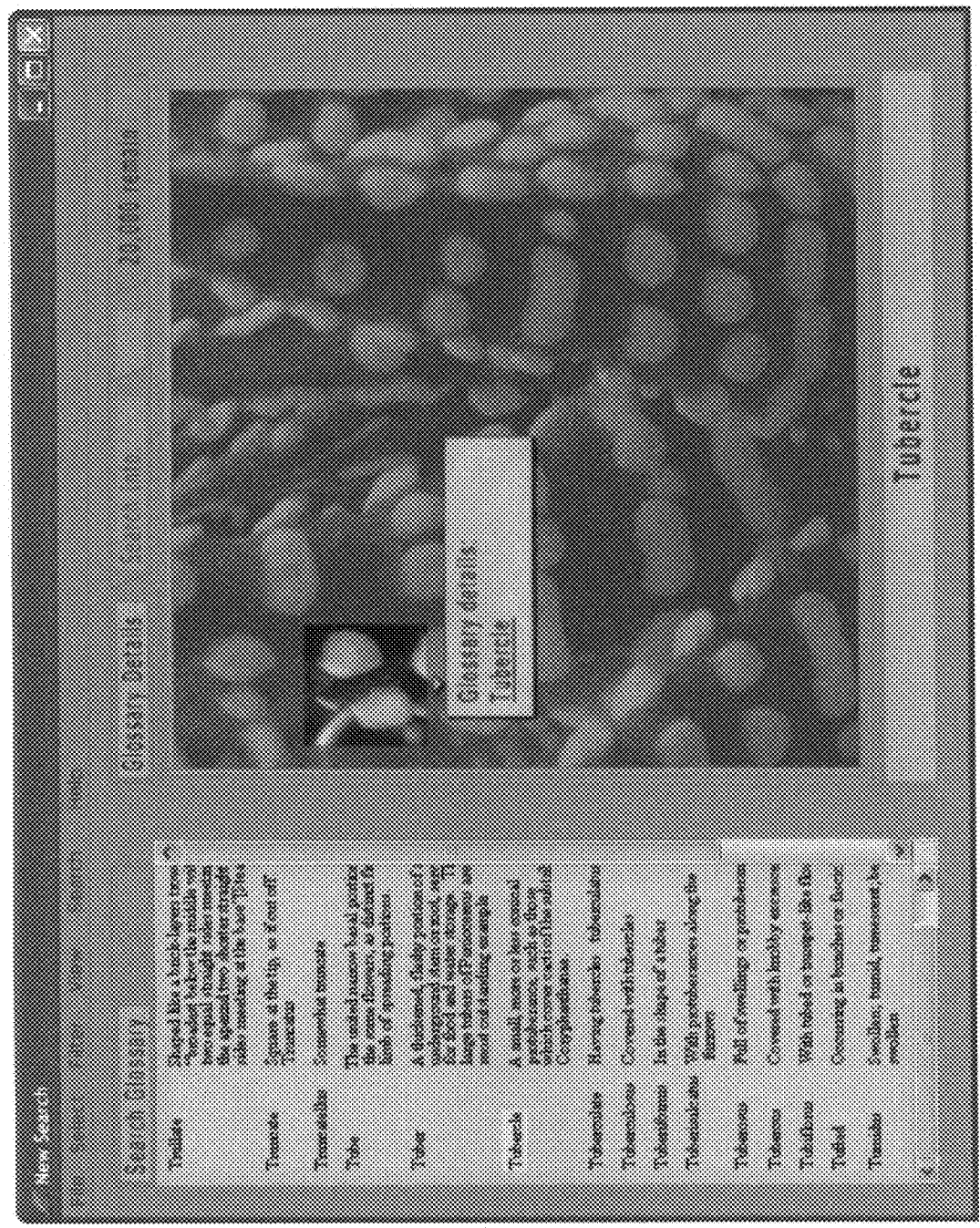
FIGS. 9 and 10 show examples of glossary display screens.

FIG. 9, a glossary screen shot, shows a trait on the profile view of a plant. This view may be accessed or activated by the user and will highlight traits that are used to identify or select a plant. This feature may be used to illustrate multiple glossary terms in a single image, or to clarify the location of a specific trait. This feature will be used primarily when the user will benefit from the enhanced isolation of a specific trait.

Figure 10:
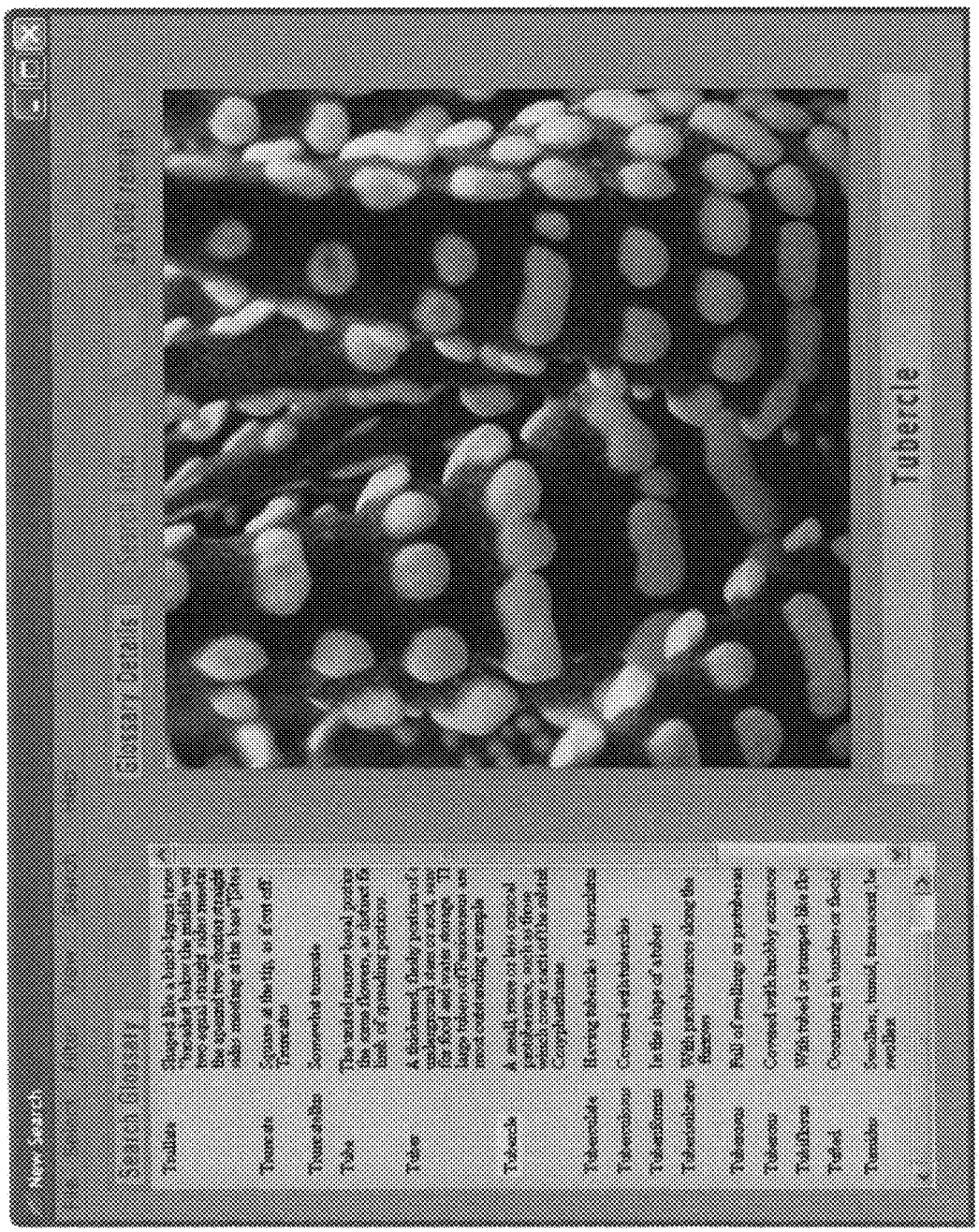

FIG. 10, a second glossary screen shot, shows another use of a glossary. The glossary mode can be accessed without losing the guided or self-guided search. Glossary terms will be illustrated to emphasize the basic character of a trait. Some glossary terms may require multiple images. This treatment will be used when the trait is extremely variable (and a single image could lead to confusion.)

It should also be understood that a user can access a glossary without losing the current search, as this feature is accessed through a separate mode.

Figure 11:
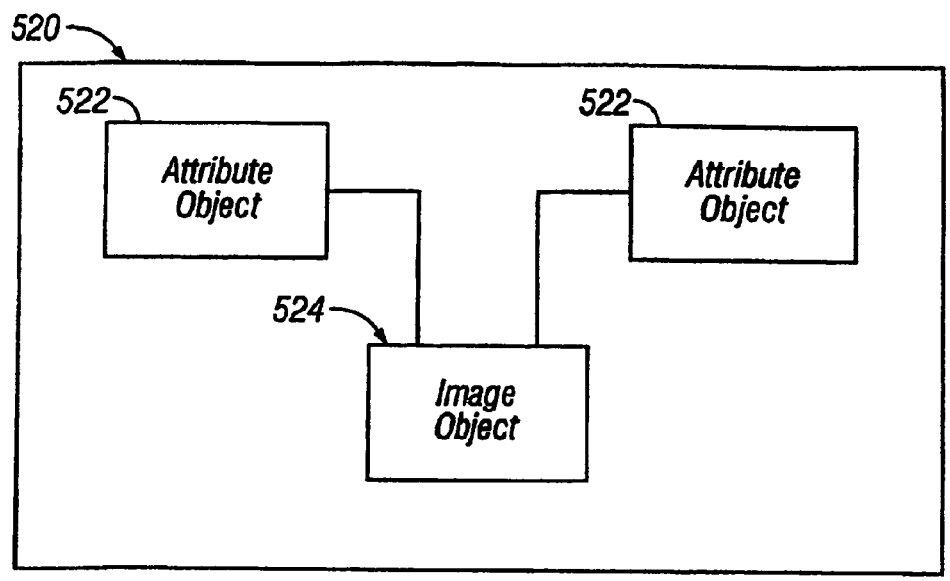
FIG. 11 shows a data structure according to the present invention.

FIG. 11 shows that in one embodiment of the present invention, a data structure in a datastore 520 is provided. The data structure includes information resident in a database used by the application program and includes a plurality of attribute data objects 522 and at least one image object 524. The plurality of attribute data objects containing different information. The data objects may contain information that is linked to another database. The plurality of image objects may contain images of the apical complex of plant species and each of the image objects have a linked relationship to at least one of the attribute data objects, wherein the images are created based on a standard for distance and other features.

Figure 12:
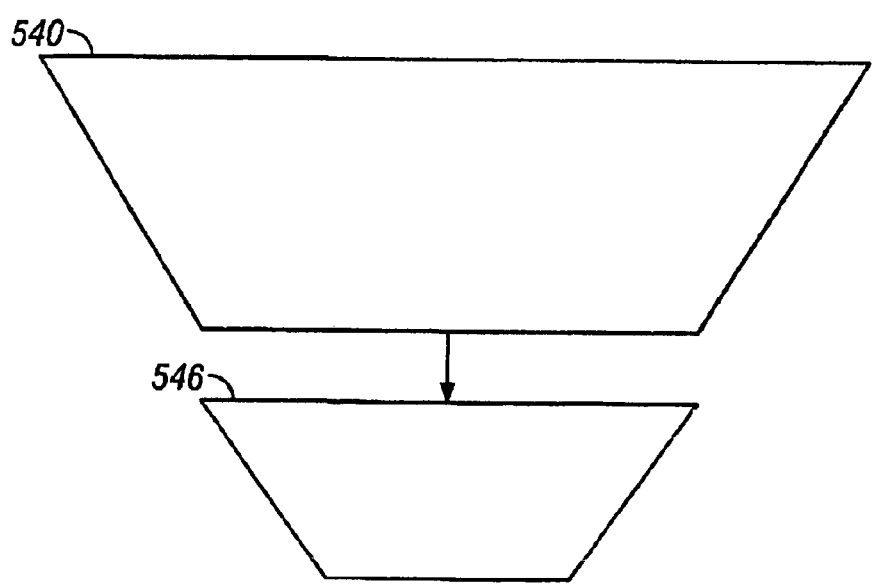
FIG. 12 shows a schematic describing how a search in one embodiment of the present invention is organized.

Referring now to FIG. 12, a graphic representation is shown of one method of guiding a user in one embodiment of a plant selection system according to the present invention. FIG. 12 shows that the initial questions represented by funnel 540 will ask the user to select search criteria that will narrow down the possible matches. In the portion of the search represented by funnel 546, the search is driven by further search criteria selected by the user. The user can continue to search using additional search criteria until a suitable number of potential matches is found.

Figure 13:
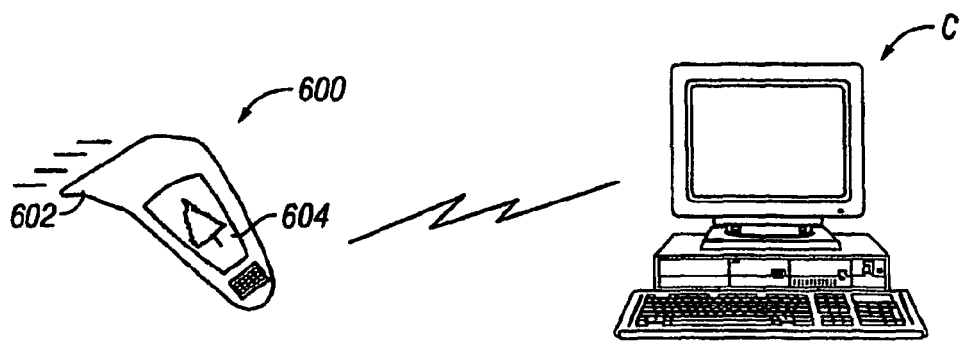
FIG. 13 shows a handheld device according to the present invention.

Referring now to FIG. 13, with any of the embodiments above, a hand-held inventory product 600 containing this selection system may be used. The hand-held bar-code inventory systems may be used by commercial nurseries as an identification device. Some embodiments may have an infrared bar code reader or RFID tag reader 602 to read identification. The information is then transmitted to a computer C by either wired or wireless means. Others may optionally, have a screen 604 to show images of the plant. The screen may be touch sensitive to allow a user to select among different options presented to the user to identify or select the plant or to manage inventory. A miniature keyboard or other buttons may also be included to allow for entry of data.

Figure 14:
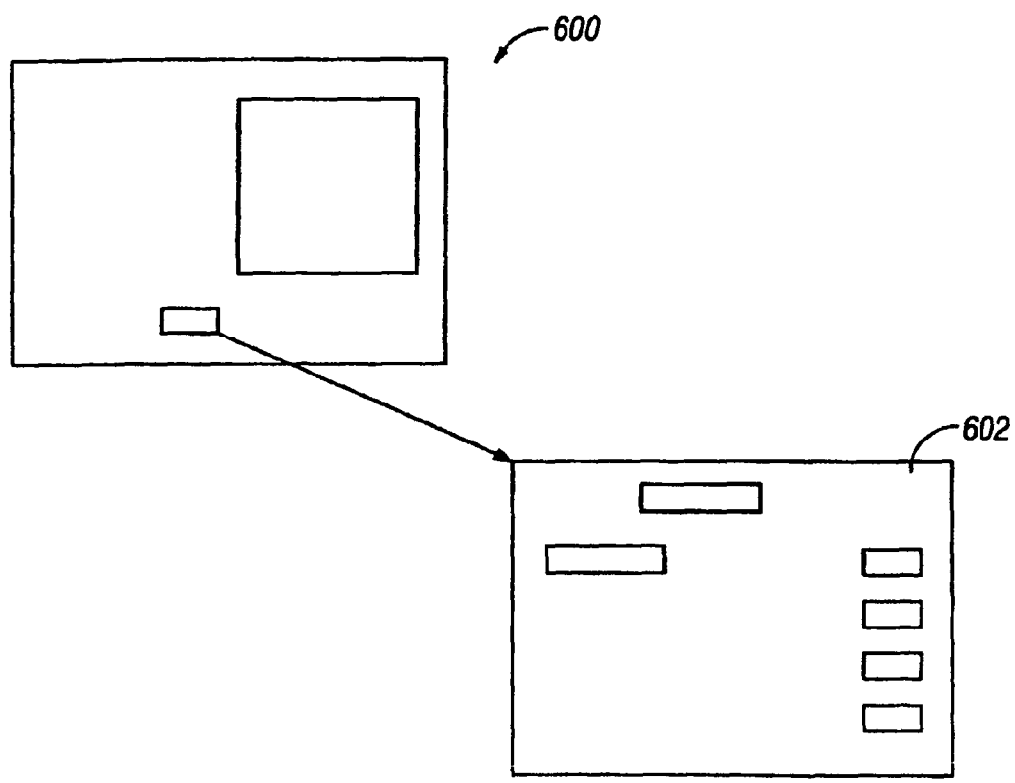
FIG. 14 shows an E-commerce system according to the present invention.

Referring now to FIG. 14, the user may also be presented with options to purchase particular plants from the client or from the website. As seen in FIG. 14, after a plant has been selected in screen shot 600, there may be link or button that may lead to another screen 602 that allows a user to purchase the selected plant. The link may lead to the same website or it may lead to an affiliate website that sells the desire plant.

Although the invention has been described herein with reference to specific embodiments, conceivably, many modifications and variations therein will readily occur to those skilled in the art. The preferred embodiments are disclosed and described in detail and are as exemplary and is therefore not intended to be limiting of the invention. Accordingly, all such variations and modifications are included within the intended scope of the invention. With any of the embodiments above, a hand-held inventory product containing this selection system may be used. A hand-held bar-code inventory identification system or RFID (radio-frequency identification) labeling system may be used by commercial nurseries as an identification device. The present system may provide a plurality of search options (guided). Some of these are nested searches. With any of the embodiments above, the present application may be implemented within a framework of an Application Service Provider (ASP), embedded in a central computer platform, and accessible to users over a data communication network, such as but not limited to the Internet or Intranet. The ASP approach imparts the application the ability to establish a plant species data warehouse, which enables a continuous and updating of plant species in the database, and allows users to access the large database without requiring the user to store the images on their local machines. Some embodiments may of course, store images to the local drive if desired by the user.

The publications discussed or cited herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed. All publications mentioned herein are incorporated herein by reference to disclose and describe the structures and/or methods in connection with which the publications are cited. For example, U.S. Provisional Application No. 60/530,359 filed Dec. 16, 2003 is incorporated herein by reference for all purposes.

Expected variations or differences in the results are contemplated in accordance with the objects and practices of the present invention. It is intended, therefore, that the invention be defined by the scope of the claims which follow and that such claims be interpreted as broadly as is reasonable.

What is claimed is:

1. A process for plant selection, comprising:
providing to a user a database of plant species comprising an image of an above-ground apical complex for each plant, wherein said image has sufficient resolution such that the user can see distinguishing characteristics of the apical complex sufficient to distinguish each plant species from all other plant species in the same genus in the database;
eliminating a portion of the plant species using at least two search criteria to further eliminate unsuited plant species; and
displaying to the user at least one image of the plant species meeting the search criteria, at least one of said images being of distinguishing characteristics of the apical complex typical for the plant species.

2. The process of claim 1, wherein the search criteria to further eliminate unsuited plant species comprise: desired climate zone or location, plant cultivation, plant size, plant type, plant leaf type/shape, plant form/habit, plant primary attributes, desired exposure, flowering season, parcel growing conditions, and desired characteristics.

3. The process of claim 1, wherein said search criteria are presented as both text prompts and image prompts.

4. The process of claim 3, wherein at least one of said image prompts is an image of the apical complex.

5. The process of claim 1, wherein desired climate zone or location is used to eliminate a portion of the plant species.

6. The process of claim 1, wherein at least three of the search criteria listed in the group are used to eliminate unsuited plant species.

7. The process of claim 1, wherein at least four of the search criteria are used to eliminate unsuited plant species.

8. The process of claim 1, wherein at least five of the search criteria are used to eliminate unsuited plant species.

9. The process of claim 1 wherein at least six of the search criteria are used to eliminate unsuited plant species.

10. The process of claim 1, wherein images of potential plant species meeting the search criteria are simultaneously displayed when there are less than 50 potential candidates.

11. The process of claim 1, further comprising displaying a number representing the potential plant species meeting the search criteria during the search, said number being reduced with each search criteria.

12. The process of claim 1, wherein the database of plant species is compiled by
   locating an apical complex of the plant,
   obtaining an image of the distinguishing characteristics of the apical complex typical for the plant species,
   correlating said image with information from a knowledge database on the plant species related to a set of selection criteria, and
   storing said image and said selection criteria information in a database.

13. The process of claim 12, wherein said database comprises a plurality of records having a number of data fields including both text and image fields.

14. The process of claim 13, wherein said database is in computer readable form.

15. The process of claim 12, wherein said images are photographic.

16. The process of claim 1, wherein said eliminating a portion of the plant species using at least two search criteria to further eliminate unsuited plant species is performed using the following steps:
   providing a user interface;
   displaying on the user interface, a first set of search criteria presented as text prompts and image prompts;
   receiving the user selection;
   processing the user selection based on a selection tree and presenting a second set of search criteria presented as text prompts and image prompts based on the user selection; and
   receiving the user selection from the second set of text prompts and image prompts;
   repeating the displaying, receiving, and processing until the user is presented with images of potential plant matches.

17. A process for plant selection, comprising:
   providing a database of plant species, wherein said database comprises: an image database comprising
   a) a plurality of images of plant species including an image of an above-ground apical complex for each plant, wherein said image has sufficient resolution such that the user can see distinguishing characteristics of the apical complex sufficient to distinguish each plant species from all other plant species in the same genus in the database, and
   b) a knowledge database, cross-referenced to said image database, for the purpose of assisting in the selection process;
   eliminating a portion of the plant species using at least two search criteria to further eliminate unsuited plant species using a user-interface to solicit, from a user in a sequential manner, a plurality of descriptive traits of a desired plant, and a selection tree, responsive to each of said traits, wherein said traits are employed by an engine to select, from a plurality of possible matches, a subset of matches that are consistent with the traits, and using the subset of matches, reorganizing an information space of said image database for concurrent presentation of a plurality of images for user review via the user-interface;
   wherein the user-interface is configured to continue to solicit descriptive traits based on the new subset of matches until the traits to be processed by the selection tree reduces the number of potential candidates below a predetermined level; and wherein the user-interface is configured to continue soliciting distinguishing characteristics until a sufficient number of candidates below the predetermined level remain; and
   displaying to the user at least one image of the plant species meeting the search criteria, at least one of said images being of distinguishing characteristics of the apical complex typical for the plant species.

18. The process of claim 16, further comprising displaying images of all plants meeting the search criteria if there are no more than 100 matches.

19. The process of claim 16, further comprising displaying images of all plants meeting the search criteria if there are no more than 50 matches.

20. The process of claim 16, further comprising displaying images of all plants meeting the search criteria if there are no more than 25 matches.

21. The process of claim 16, further comprising displaying images of all plants meeting the search criteria if there are no more than 10 matches.

22. A plant selection system comprising:
   a client running on a client device;
   a server;
   said client configured to communicate with the server and display a user interface;
   said server having a processor with logic to process input from the user and send image data to the client for display to the user;
   said server configured to implement the process as set forth in claim 16 to guide the user to select plants.

23. The system of claim 22, wherein image data is stored on the server.

24. The system of claim 22, wherein a portion of the image data is stored by the client on a local computer.

25. The process of claim 1, wherein said database further comprises a variety of information about each plant species, including information pertaining to selection criteria.

26. The process of claim 1, wherein said database further comprises an image database comprising a plurality of images of plant species, and a knowledge database, cross-referenced to said image database.

* * * * *